United States Patent
Sasaki et al.

(10) Patent No.: US 11,669,264 B2
(45) Date of Patent: Jun. 6, 2023

(54) METHOD FOR IMPROVING TRIM COMMAND RESPONSE TIME

(71) Applicant: Kioxia Corporation, Tokyo (JP)

(72) Inventors: Yuki Sasaki, Kamakura (JP); Shinichi Kanno, Ota (JP)

(73) Assignee: Kioxia Corporation, Tokyo (JP)

(*) Notice: Subject to any disclaimer, the term of this patent is extended or adjusted under 35 U.S.C. 154(b) by 18 days.

(21) Appl. No.: 17/201,004

(22) Filed: Mar. 15, 2021

(65) Prior Publication Data
US 2022/0011964 A1    Jan. 13, 2022

(30) Foreign Application Priority Data

Jul. 13, 2020 (JP) .............................. JP2020-119879

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0611* (2013.01); *G06F 3/0679* (2013.01); *G06F 12/0246* (2013.01); *G06F 2212/7201* (2013.01)

(58) Field of Classification Search
CPC .............. G06F 3/0611; G06F 12/0246; G06F 2212/7201
See application file for complete search history.

(56) References Cited

U.S. PATENT DOCUMENTS

| | | | |
|---|---|---|---|
| 9,026,734 B2 | 5/2015 | Hashimoto | |
| 2010/0049907 A1 | 2/2010 | Kitsunai et al. | |
| 2014/0004721 A1 | 2/2014 | Cohen et al. | |
| 2014/0372685 A1 | 12/2014 | Jeong et al. | |
| 2018/0067849 A1 | 3/2018 | Kanno | |
| 2019/0236003 A1 | 8/2019 | Kanno | |
| 2019/0265909 A1* | 8/2019 | Frolikov | G06F 3/0659 |

FOREIGN PATENT DOCUMENTS

| | | |
|---|---|---|
| JP | 2009-163329 A | 7/2009 |
| JP | 2018-041204 A | 3/2018 |

* cited by examiner

*Primary Examiner* — David Yi
*Assistant Examiner* — Nicholas A. Paperno
(74) *Attorney, Agent, or Firm* — Oblon, McClelland, Maier & Neustadt, L.L.P.

(57) ABSTRACT

According to one embodiment, a memory system includes a non-volatile memory and a controller. The non-volatile memory is configured to store an address translation table and a data map. In a case where an invalidation command for invalidating the data written in the non-volatile memory is received from the host, the controller is configured to update the address translation table and the data map based on the invalidation command. A response to the invalidation command is transmitted to the host after the address translation table is updated and before the data map is updated.

18 Claims, 15 Drawing Sheets

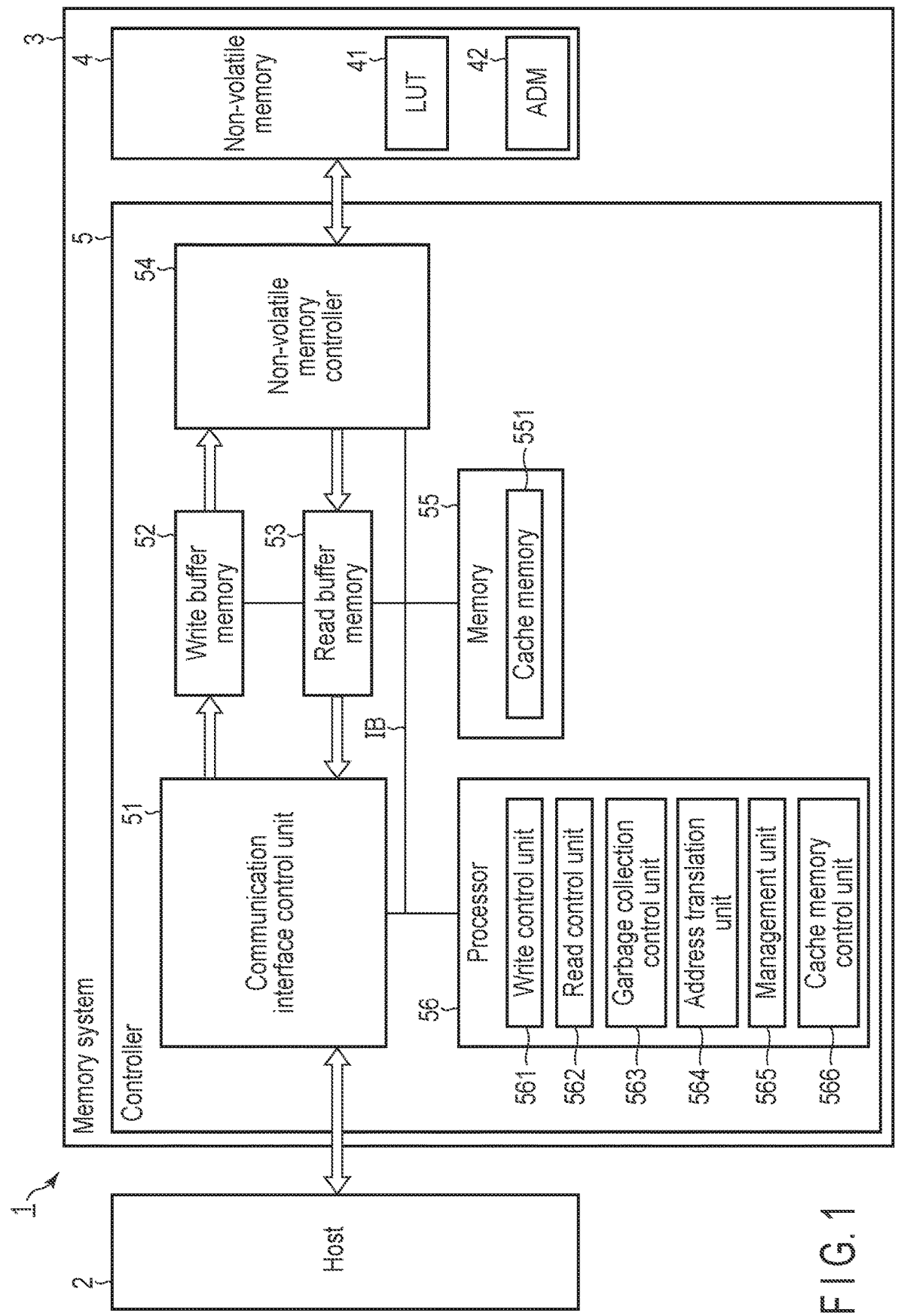
F I G. 1

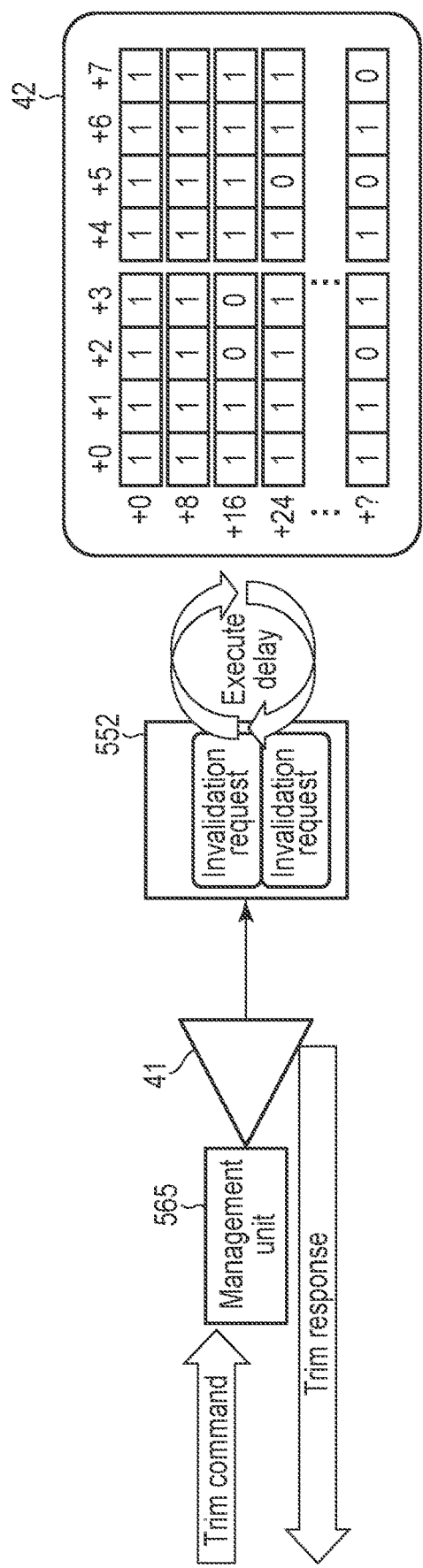
F I G. 6

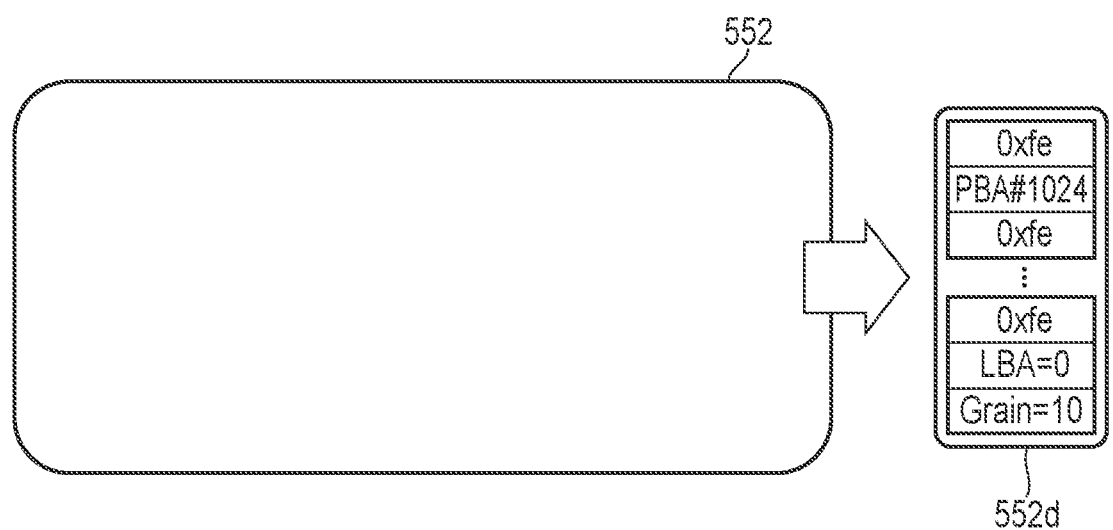
F I G. 18

METHOD FOR IMPROVING TRIM COMMAND RESPONSE TIME

CROSS-REFERENCE TO RELATED APPLICATIONS

This application is based upon and claims the benefit of priority from Japanese Patent Application No. 2020-119879, filed Jul. 13, 2020, the entire contents of which are incorporated herein by reference.

FIELD

Embodiments described herein relate generally to a memory system and an information processing system.

BACKGROUND

In recent years, a memory system including a non-volatile memory has become widespread. As an example of such a memory system, for example, a solid state drive (SSD) including a NAND type flash memory has been known.

In the memory system, an address translation table that manages a correspondence between a logical address used by the host to access the memory system and a physical address corresponding to a location where data in a non-volatile memory is written is used, and the address translation that translates the logical address designated in the command transmitted from the host into the physical address is executed.

In this regard, in a case where a predetermined file is deleted in a file system used by the host, a command (hereinafter, referred to as Trim command) for invalidating the data corresponding to the file is issued from the host to the memory system.

When this Trim command is received in the memory system, the memory system executes a process of updating the above-described address translation table (correspondence between the logical address and the physical address).

In addition, the memory system stores a valid data map that manages whether the data written in the non-volatile memory is valid or invalid, and in a case where the above Trim command is received, the valid data map is also updated.

A mechanism for shortening the response time for the Trim command is desired.

BRIEF DESCRIPTION OF THE DRAWINGS

FIG. 1 is a block diagram illustrating an example of a configuration of an information processing system including a memory system according to an embodiment.

FIG. 6 is a diagram for explaining an outline of an operation of a memory system according to the present embodiment.

FIG. 18 is a diagram for explaining a specific operation example when executing the invalidation request stored in an invalidation request queue in the modified example of the present embodiment.

DETAILED DESCRIPTION

Figure 2:
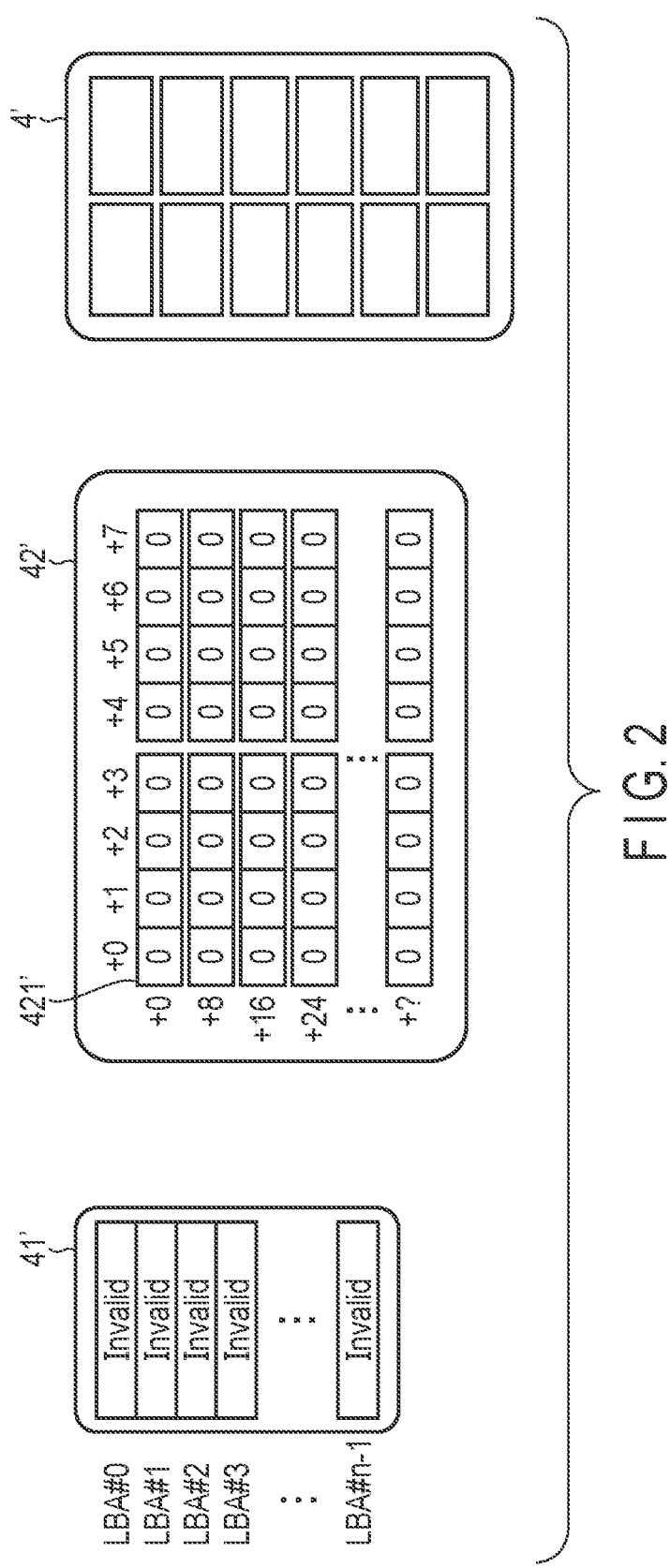
FIG. 2 is a diagram for explaining an operation of LUT and ADM.

Various embodiments will be described hereinafter with reference to the accompanying drawings.

In general, according to one embodiment, a memory system that is connectable to a host is provided. The memory system includes a non-volatile memory and a controller configured to be electrically connected to the non-volatile memory to control the non-volatile memory. The non-volatile memory is configured to store an address translation table for managing a correspondence between a logical address used by the host to access the memory system and a physical address in which data in the non-volatile memory is written, and a data map for managing whether the data written in the non-volatile memory is valid or invalid. In a case where an invalidation command for invalidating the data written in the non-volatile memory is received from the host, the controller is configured to update the address translation table and the data map based on the invalidation command. A response to the invalidation command is transmitted to the host after the address translation table is updated and before the data map is updated.

FIG. 1 is a block diagram illustrating an example of a configuration of an information processing system including a memory system according to an embodiment. In the present embodiment, the memory system is a semiconductor storage device configured to write data (user data) to a non-volatile memory and read the data from the non-volatile memory. This memory system may be realized as, for example, a solid state drive (SSD), or may be realized as another storage device such as a memory card. In the present embodiment, it is assumed that the memory system is realized as an SSD.

As illustrated in FIG. 1, an information processing system 1 includes a host 2 and a memory system 3. The host 2 is an information processing device that operates as a host device for the memory system 3, and can be realized as, for example, a personal computer, a server device, a mobile phone, an imaging device, a mobile terminal (tablet computer, smartphone, or the like), a game machine, or an in-vehicle terminal (car navigation system or the like).

The memory system 3 is configured to be connectable to the host 2, and includes a non-volatile memory 4 and a controller 5 (control circuit) that controls writing and reading of data to the non-volatile memory 4. The non-volatile memory 4 may be configured to be detachable from the controller 5. According to this, the memory capacity of the memory system 3 can be freely expanded.

In a case where the memory system 3 is realized as an SSD as described above, the non-volatile memory 4 is, for example, a NAND type flash memory. In this case, the non-volatile memory 4 (NAND type flash memory) includes a plurality of memory cells (memory cell array) arranged in a matrix. The non-volatile memory 4 may be a NAND type flash memory having a two-dimensional structure or a NAND type flash memory having a three-dimensional structure.

Further, the memory cell array of the non-volatile memory 4 includes a plurality of blocks, and each of the blocks is organized by a large number of pages. In the memory system 3 (SSD), each block functions as a data erasing unit. In addition, each page is a unit of a data writing operation and a data reading operation.

In addition, various data are written in the non-volatile memory 4, and the non-volatile memory 4 further stores an address translation table (hereinafter, simply referred to as LUT) 41 called a look up table (LUT). Here, the LUT 41 is also referred to as L2P. The LUT 41 corresponds to the data for managing a correspondence of a logical address used when the host 2 accesses the memory system 3 (write data to the non-volatile memory 4 or read data from the non-volatile memory 4) with a physical address indicating a physical position where the data in the non-volatile memory 4 is written. In other words, the LUT 41 stores the physical address corresponding to each of the logical addresses.

In a case where the non-volatile memory 4 is a NAND type flash memory, the logical address managed by the LUT 41 is a logical block address (LBA), and the physical address is a physical block address (PBA). In the following description, the logical address will be described as LBA and the physical address will be described as PBA.

In addition, the non-volatile memory 4 further stores a valid data map (hereinafter, simply referred to as ADM) 42 called an active data map (ADM). The ADM 42 is data for managing whether the data written in each of the physical addresses of the non-volatile memory 4 is valid or invalid.

At least one of the LUT 41 and the ADM 42 may be stored in a non-volatile memory other than the non-volatile memory 4, for example. Further, the non-volatile memory 4 may be configured to divide the memory (region) for storing the data, the LUT 41, and the ADM 42.

The controller 5 includes a communication interface control unit 51, a write buffer memory 52, a read buffer memory 53, a non-volatile memory controller 54, a memory 55, and a processor 56. The communication interface control unit 51, the write buffer memory 52, the read buffer memory 53, the non-volatile memory controller 54, the memory 55, and the processor 56 are electrically connected via an internal bus IB.

The communication interface control unit 51 controls communication between an external device (for example, the host 2) and the memory system 3. Specifically, the communication interface control unit 51 receives various commands from the host 2. Various commands from the host 2 include, for example, a write command (write request) and a read command (read request).

Here, when the write command is received by the communication interface control unit 51, the data is written in the non-volatile memory 4 based on the write command. The write buffer memory 52 temporarily stores the data written in the non-volatile memory 4. The data stored in the write buffer memory 52 is written in the non-volatile memory 4 via the non-volatile memory controller 54.

On the other hand, when the read command is received by the communication interface control unit 51, the data is read from the non-volatile memory 4 based on the read command. The read buffer memory 53 temporarily stores data read from the non-volatile memory 4. The data stored in the read buffer memory 53 is transmitted to the host 2 via the communication interface control unit 51.

The non-volatile memory controller 54 controls writing data to the non-volatile memory 4 and reading data from the non-volatile memory 4. Although detailed description will be omitted, the non-volatile memory controller 54 may be configured to include a direct memory access controller (DMAC), an error correction unit, a randomizer (or a scrambler), and the like.

The memory 55 is a main storage device used as a working memory of the processor 56. The memory 55 is, for example, a dynamic random access memory (DRAM), and may be another semiconductor memory such as a static random access memory (SRAM).

The memory 55 can be written and read at a higher speed as compared with the non-volatile memory 4, and includes (a region used as) a cache memory 551. The cache memory 551 stores cache data such as LUT 41 and ADM 42 stored in the non-volatile memory 4, for example.

The processor 56 controls the operation of the entire controller 5 via the internal bus IB. The processor 56 executes various processes (for example, processes for various commands received from the host 2) by executing a control program (firmware) stored in, for example, a read only memory (ROM) (not shown). The processor 56 may be, for example, a central processing unit (CPU), a microprocessing unit (MPU), and a digital signal processor (DSP).

By executing the above-described control program, the processor 56 realizes functional units such as a write control unit 561, a read control unit 562, a garbage collection control unit 563, an address translation unit 564, a management unit 565, and a cache memory control unit 566.

Each of these units 561 to 566 is realized by a control program (that is, software) as described above, and may be realized by hardware or by a combination of software and hardware.

In a case where the write command is received by the communication interface control unit 51, the write control unit 561 controls the communication interface control unit 51, the write buffer memory 52, and the non-volatile memory controller 54, and causes the non-volatile memory 4 to execute a writing process for the data based on the write command.

In a case where the read command is received by the communication interface control unit 51, the read control unit 562 controls the communication interface control unit 51, the read buffer memory 53, and the non-volatile memory controller 54, and causes the non-volatile memory 4 to execute a reading process for the data based on the read command.

The garbage collection control unit 563 executes garbage collection (GC) for the non-volatile memory 4 with reference to the above-described ADM 42 by cooperating with the write control unit 561, the read control unit 562, and the non-volatile memory controller 54, for example. The garbage collection is a process of releasing an unnecessary region of the non-volatile memory 4. Note that compaction that eliminates fragmentation of the memory region of the non-volatile memory 4 may be performed together with the garbage collection.

Here, in the read command from the host 2 received by the communication interface control unit 51 described above, the LBA for the host 2 to access the data is included; however, in a case where the read command is received from the host 2, the address translation unit 564 executes a process of translating the LBA into a physical address (PBA) by using the LUT 41 stored in the non-volatile memory 4. In the memory system 3, it is possible to read data from the non-volatile memory 4 based on the PBA translated from the LBA by the address translation unit 564 in this way.

The management unit 565 executes a process of updating the LUT 41 and the ADM 42 when data is written in the non-volatile memory 4 based on the write command from the host 2 received by the communication interface control unit 51.

Further, in addition to the write command and the read command, the commands, from the host 2, received by the communication interface control unit 51 include, for example, an invalidation command (hereinafter, referred to as Trim command) for invalidating the data written in the non-volatile memory 4. When the Trim command is received by the communication interface control unit 51, the management unit 565 executes a process of updating the LUT 41 and the ADM 42 based on the Trim command. The Trim command is also referred to as, for example, an Unmap command, in accordance with the interface standard for connecting the storage device.

The cache memory control unit 566 reads (a part of) the LUT 41 or (a part of) the ADM 42 from the non-volatile memory 4 via, for example, the read control unit 562, and stores the LUT 41 or the ADM 42 in the cache memory 551. Further, the cache memory control unit 566 reads (a part of) the LUT 41 or (a part of) the ADM 42 stored in the cache memory 551 via the write control unit 561 and writes (writes back) the LUT 41 or ADM 42 into the non-volatile memory 4.

Although the example in which the memory system 3 is provided outside the host 2 has been described in FIG. 1, NVMe over Fabrics or the like may be used as the interface between the host 2 and the memory system 3. Further, the memory system 3 may be built in the host 2. Further, the memory system 3 may be connected to a plurality of hosts 2, or a plurality of memory systems 3 may be connected to one or more hosts 2.

Here, the operation of the LUT and the ADM will be described with reference to FIGS. 2 to 5. Note that, in FIGS. 2 to 5, the non-volatile memory, the LUT, and the ADM are simply illustrated for convenience of explanation.

First, FIG. 2 illustrates LUT41' and ADM 42' in an initial state (that is, a state in which no data is written in a non-volatile memory 4'). The non-volatile memory 4' illustrated in FIG. 2 indicates that no data has been written in all the PBAs of the non-volatile memory 4'.

In the LUT 41', the correspondence between the LBA and PBA for each of the data written in the non-volatile memory 4' is managed as described above; however, since the data is not written in the non-volatile memory 4' in in FIG. 2, PBA (PBA corresponding to LBA #0 to LBA #n−1) is not stored in the LUT 41'. In a case where there is no PBA corresponding to the LBA, a magic number indicating invalidity is set (stored) in the LUT 41' in association with the LBA.

On the other hand, in the ADM 42', it is managed whether the data written in the non-volatile memory 4' is valid or invalid. Specifically, in the ADM 42', 1-bit flag information 421' corresponding to each PBA of the non-volatile memory 4' in which data is written is stored. According to such ADM 42', the flag information 421' can indicate whether the data stored in the PBA corresponding to the flag information 421' is valid or invalid.

The flag information indicating that the data is valid is, for example, "1", and the flag information indicating that the data is invalid is, for example, "0". In FIG. 2, since no data is written in the non-volatile memory 4', all the flag information stored in the ADM 42' is "0".

Although not illustrated in FIG. 2, the ADM 42' is prepared for each block, which is a data erasing unit, for example.

Next, the operation of the LUT41' and ADM 42' when a write command is received from the host 2 will be described with reference to FIG. 3.

In the write command, the data to be written in the non-volatile memory 4 and the LBA for accessing the data are designated. Here, it is assumed that data #1 and LBA #1 for accessing the data #1 and data #2 and LBA #3 for accessing the data #2 are designated in the write command.

In a case where the write command for the LBA #1 and LBA #3 as described above is received from the host (step S1), the data #1 and data #2 designated in the write command are written in vacant PBA in the non-volatile memory 4' (step S2). Here, it is assumed that the data #1 is written to PBA #0 of the non-volatile memory 4' and the data #2 is written to PBA #1 of the non-volatile memory 4'. The size of the data written in a PBA is, for example, 4 KiB, but the size of the data can be changed optionally.

In this case, the ADM 42' is updated to enable the PBA #0 and PBA #1 (that is, the data written in PBA #0 and PBA #2) in which the data #1 and data #2 were written (step S3). Specifically, as illustrated in FIG. 3, among the flag information stored in ADM 42', the flag information corresponding to the PBA #0 and PBA #1 in which the data #1 and data #2 are written is changed from "0" to "1".

Further, since the LBA #1 and LBA #3 are designated in the write command received in step S1, the PBA corresponding to the LBA #1 and LBA #3 is updated in LUT41' (step S4). Specifically, PBA #0 is associated with the LBA #1 and stored in the LUT41', and the PBA #1 is associated with the LBA #3 and stored in the LUT41'. The size of the PBA stored in LUT41' is, for example, 32 bits (4 bytes).

When LUT41' and ADM 42' are updated as described above, the response to the write command received in step S1 is transmitted (returned) to the host 2.

Next, the operation of the LUT41' and ADM 42' when Trim command is received from the host 2 will be described with reference to FIG. 4. In FIG. 4, it is assumed that the Trim command is received after the LUT 41' and ADM 42' have been updated (that is, the response to the write command has been transmitted to the host 2) as described in FIG. 3.

The Trim command is a command for invalidating the data written in the non-volatile memory 4' as described above. For example, when a predetermined file is deleted in the file system used by the host 2, the Trim command is issued by the host 2 to invalidate the data corresponding to the file. In this Trim command, the LBA for the data to be invalidated is designated (that is, the Trim command includes the LBA). Here, it is assumed that the LBA #1 is designated in the Trim command.

Figure 3:
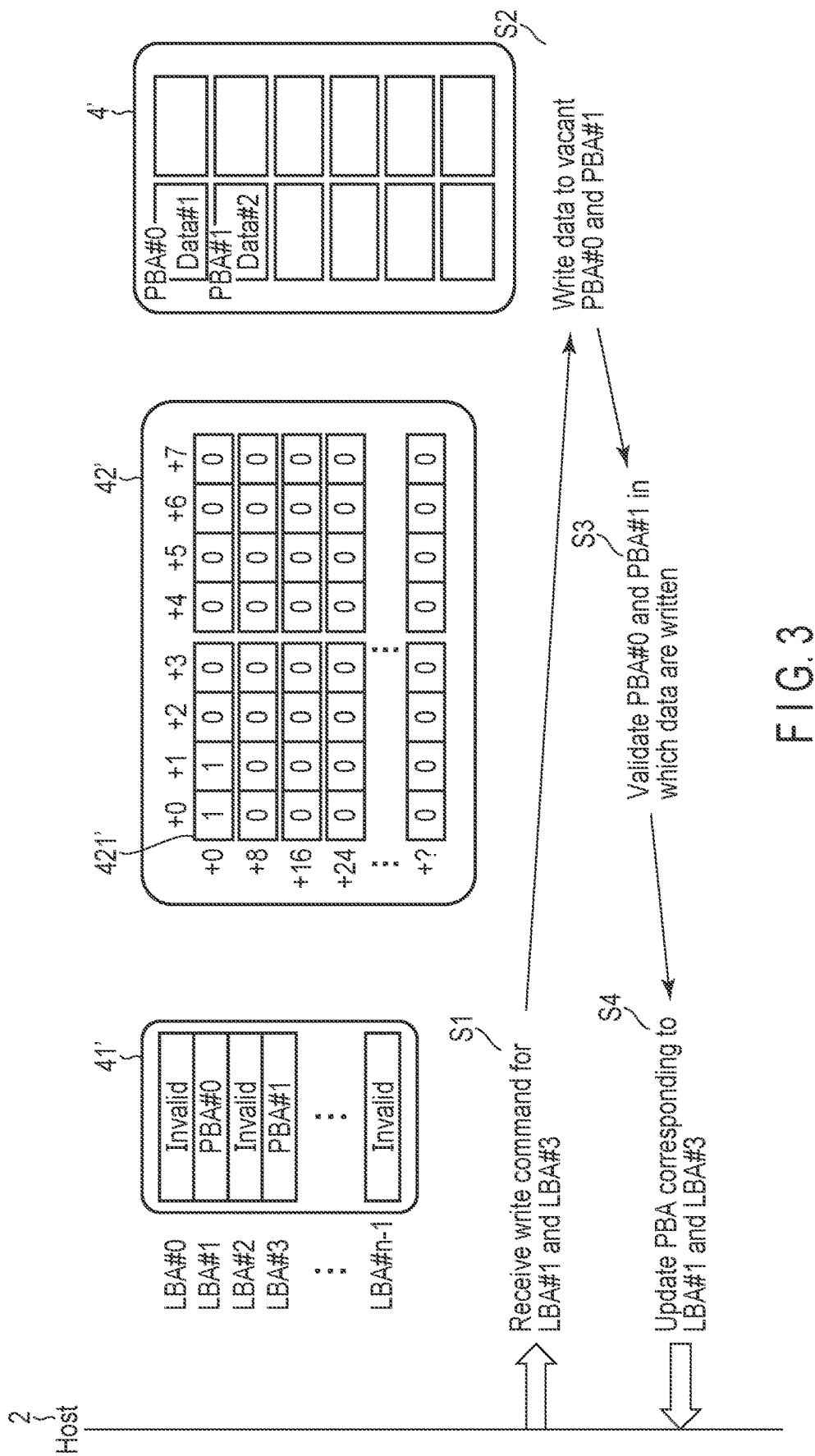
FIG. 3 is a diagram for explaining the operation of LUT and ADM.
Figure 4:
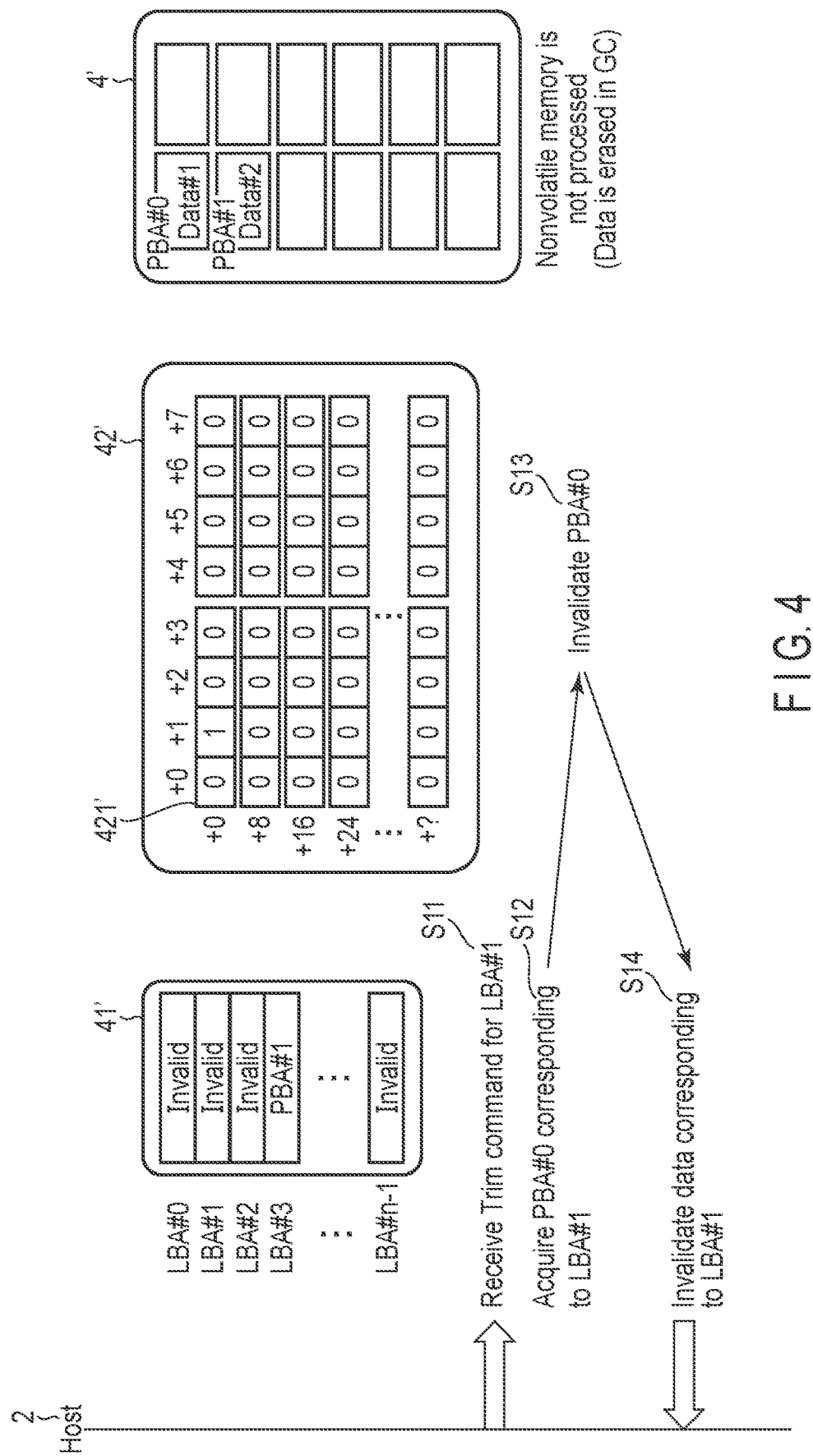
FIG. 4 is a diagram for explaining the operation of LUT and ADM.

In a case where the Trim command as described above is received (step S11), the PBA #0 corresponding to the LBA #1 designated in the Trim command is acquired from LUT41' illustrated in FIG. 3 (step S12).

In this case, the ADM 42' illustrated in FIG. 3 is updated to ADM 42' illustrated in FIG. 4 in order to invalidate (data stored in) PBA #0 acquired in step S12 (step S13). In this case, in the ADM 42', the flag information corresponding to the PBA #0 acquired from the LUT41' based on the Trim command is changed from "1" to "0".

Further, in order to invalidate the (data stored in) PBA #0 corresponding to the LBA #1 designated in the Trim command received in step S11, the LUT 41' illustrated in FIG. 3 is updated to the LUT 41' illustrated in FIG. 4 (step S14). In this case, in the LUT41', the magic number is set as the PBA corresponding to the LBA #1.

When the LUT41' and ADM 42' are updated as described above, the response (completion notification) to the Trim command received in step S11 is transmitted (returned) to the host 2.

In the Trim process (process for the Trim command), the data written in the non-volatile memory 4' is not erased. The data written in the non-volatile memory 4' is erased by the above-described garbage collection (GC).

Here, in FIG. 4, although the case where the Trim command with a single LBA designated is received has been described, with reference to FIG. 5, an operation of the LUT41' and ADM 42' in the case where the Trim command with a wide range of LBAs designated is received will be described.

Here, it is assumed that data including data #10 to data #21 and the like has already been written in the non-volatile memory 4', and the LUT 41' and ADM 42' are appropriately updated according to the writing of the data.

In the case where the Trim command with a wide range of LBAs designated is received as described above (step S21), a LBA in the wide range of LBAs is set as a target LBA, and the processes of steps S22 to S24 corresponding to steps S12 to S14 illustrated in FIG. 4 are executed for the target LBA. Since the processes of steps S22 to S24 are the same as the processes described in steps S12 to S14 illustrated in FIG. 4, detailed description thereof will be omitted here.

In a case where the process of step S24 is executed as described above, the processes of steps S22 to S24 are repeated with other LBAs corresponding to the wide range of LBAs designated in the Trim command as target LBAs. That is, in a case where the wide range of LBAs are designated in the Trim command, until the invalidation of the data corresponding to all the LBAs designated in the Trim command (update of the LUT41' and ADM 42') is completed, the processes of steps S22 to S24 are sequentially executed (step S25).

When the data invalidation for all LBAs is executed by executing the process of step S25, the response to the Trim command received in step S21 is transmitted (returned) to the host 2.

As described above, in the case where the wide range of LBAs are designated in the Trim command, the update of the LUT41' and ADM 42' (data invalidation) is widespread, and the execution time (that is, time to return the response to the Trim command to the host 2) of the Trim process will be prolonged. Since the prolonged execution time of the Trim process is less affected than the writing process to the non-volatile memory 4, it is easy to hide, which causes a delay of the process for other subsequent commands (write command, read command, other Trim command, and the like).

Therefore, the memory system 3 according to the present embodiment has a configuration for shortening the response time to the Trim command. Hereinafter, the memory system 3 according to the present embodiment will be described in detail.

FIG. 6 is a diagram for explaining an outline of an operation of the memory system 3 according to the present embodiment. When the Trim command is received from the host 2 in the memory system 3 according to the present embodiment, the management unit 565 illustrated in FIG. 1 updates the LUT 41 based on (LBA designated in) the Trim command and also stores the invalidation request (request for invalidating data in ADM 42) based on the Trim command in the invalidation request queue 552. The response to the Trim command (Trim response) is transmitted to the host 2 after the update of the LUT41 is completed.

The invalidation request queue 552 is a dedicated queue for storing invalidation requests, and is different from the queue for storing commands received from the host 2. A region of the invalidation request queue 552 in which the invalidation request is stored is secured in the memory 55, for example, but may be secured in a storage device different from the memory 55.

That is, in the present embodiment, the update of the LUT 41 is executed before the transmission of the Trim response, but the update of the ADM 42 is executed after the transmission of the Trim response according to the queued invalidation request (that is, it is executed with a delay).

Figure 5:
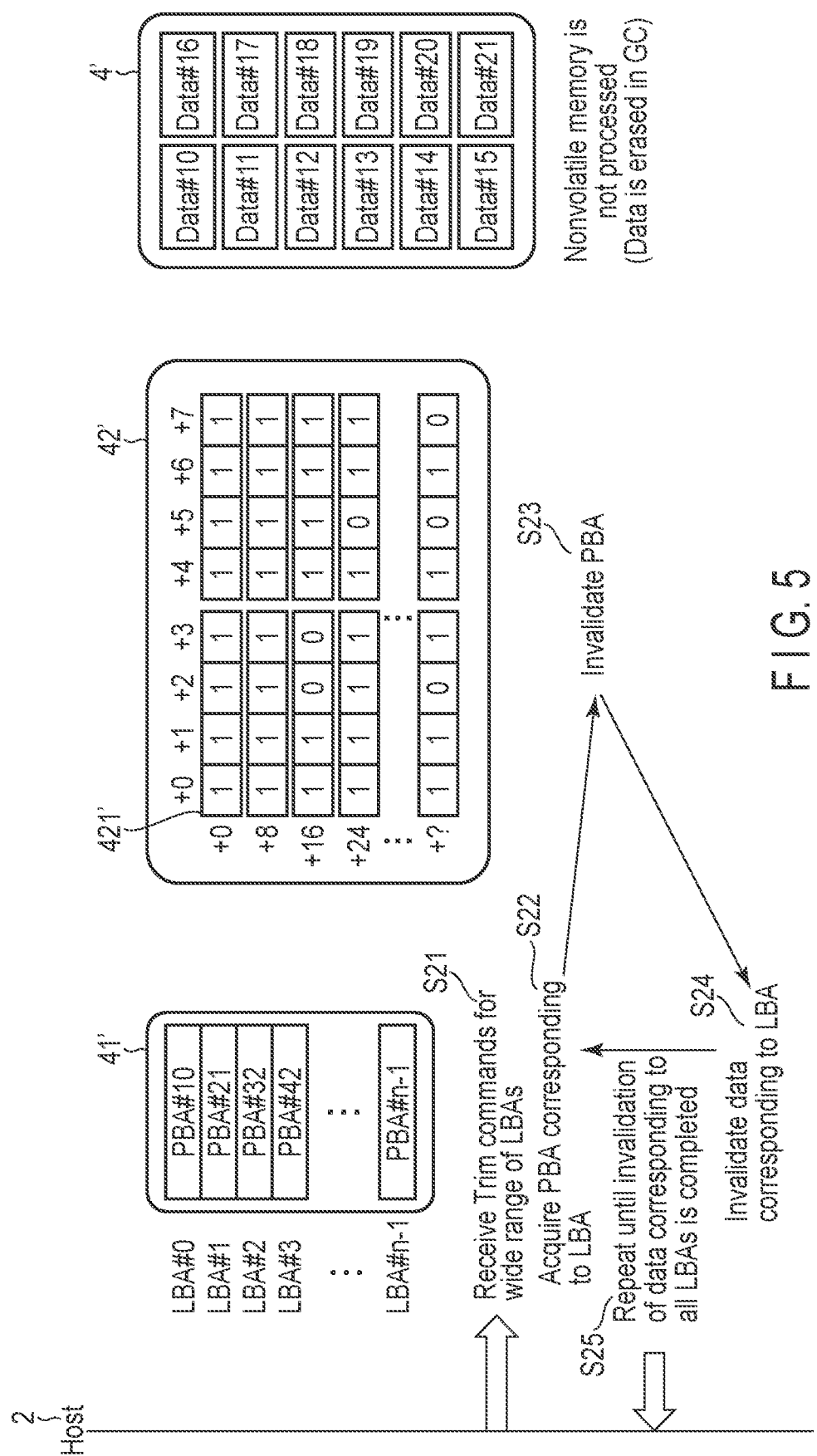
FIG. 5 is a diagram for explaining the operation of LUT and ADM.

With such a configuration, even if the wide range of LBAs are designated in the Trim command as described above, the response time to the Trim command can be shortened compared to the case where the Trim response is transmitted after the completion of data invalidation (updates of LUT41' and ADM 42') for all LBAs as described in FIG. 5.

In the present embodiment, it is possible to shorten the response time to the Trim command as described above, but in the case where the wide range of LBAs are designated in the Trim command, it is necessary to set a magic number for each sector (PBA) in each entry in LUT41' (a single hierarchy LUT that manages all LBAs and PBAs in a single layer) as described in FIGS. 2 to 5. In this case, it takes time to update LUT41'.

Therefore, it is assumed that the LUT 41 in the present embodiment has a hierarchical structure (a plurality of layers) and is configured to include a plurality of tables (hereinafter, referred to as fragment tables) corresponding to the plurality of hierarchies. The data structure of the LUT 41 is determined based on the setting information of the memory system 3 including the capacity of the non-volatile memory 4, for example.

In such a LUT 41, it is assumed that the plurality of fragment tables have the same size, for example. Further, as will be described in detail later, in the fragment table corresponding to the upper hierarchy among the plurality of fragment tables corresponding to the plurality of hierarchies, (the range of) LBA, reference destination information (hereinafter, referred to as a pointer) for referencing the fragment table corresponding to the hierarchy lower than the fragment table, and the like are stored. The pointer includes, for example, the PBA of the non-volatile memory 4 in which the fragment table to be a reference destination is stored. Further, in the fragment table corresponding to the lowest hierarchy in the hierarchical structure of the LUT 41, the PBA corresponding to each of the LBAs allocated to the fragment table is stored.

That is, the LUT 41 in the present embodiment has a hierarchical structure in which the fragment table corresponding to the upper hierarchy can be sequentially referred to from the fragment table corresponding to the lower hierarchy, and the correspondence between LBA and PBA in the hierarchical structure is managed.

Hereinafter, the LUT 41 having a hierarchical structure will be conceptually described with reference to FIG. 7. In the example illustrated in FIG. 7, the LUT 41 includes a plurality of first to fourth fragment tables T1 to T4.

Figure 7:
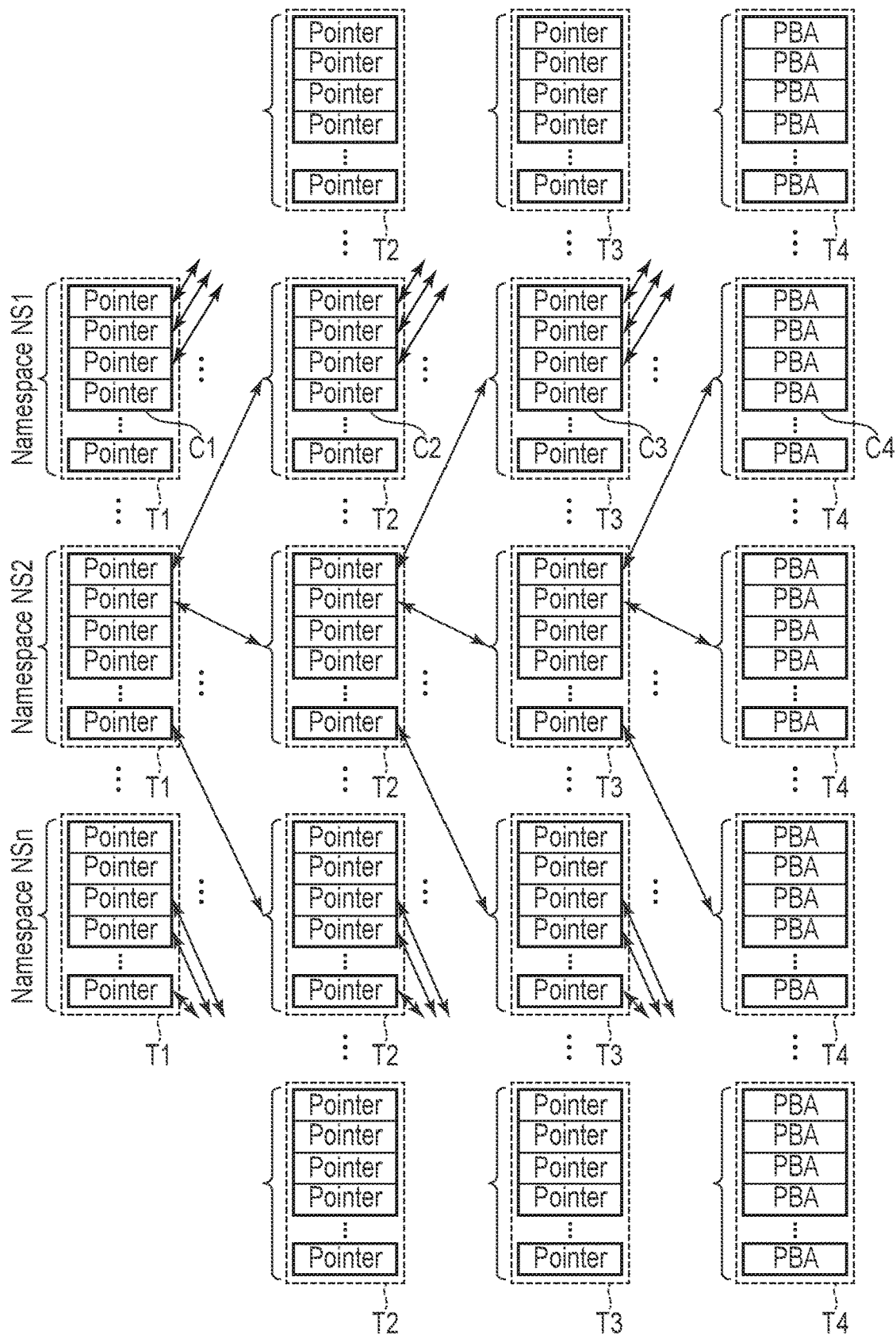
FIG. 7 is a diagram for conceptually explaining LUT having a hierarchical structure in the present embodiment.

As illustrated in FIG. 7, the first fragment table T1 is a fragment table corresponding to the highest hierarchy in the hierarchical structure of the LUT 41. The second fragment table T2 is a fragment table corresponding to a lower hierarchy of the first fragment table T1 in the hierarchical structure of the LUT 41. The third fragment table T3 is a fragment table corresponding to a lower hierarchy of the second fragment table T2 in the hierarchical structure of the LUT 41. The fourth fragment table T4 is a fragment table corresponding to a lower hierarchy of the third fragment table T3 in the hierarchical structure of the LUT 41 (the lowest hierarchy in the hierarchical structure of the LUT 41). In the following description, the hierarchies corresponding to the first to fourth fragment tables T1 to T4 are referred to as the first to fourth hierarchies.

Here, each of the plurality of first fragment tables T1 corresponding to the first hierarchy corresponds to each of the plurality of namespaces. The namespace is a region obtained by logically dividing a storage region (plurality of blocks) in the non-volatile memory 4. By allocating a namespace for each storage region in a predetermined range, for example, even if LBAs overlap in two or more storage regions, it is possible to access to appropriate data by using the namespace ID (identification information for identifying the namespace) and LBA. According to this, access to different namespaces can be treated in the same way as access to different devices.

In FIG. 7, the plurality of first fragment tables T1 correspond to the namespaces NS1 to NSn (n is a natural number of 2 or more). In this case, the number of multiple fragment tables T1 is n.

As illustrated in FIG. 7, the LUT 41 has a hierarchical structure for each of (the first fragment table T1 corresponding to) the namespaces NS1 to NSn, and the number of hierarchies for each of the namespaces NS1 to NSn is determined according to the storage region (size) allocated to the namespace NS1 to NSn. For example, in a case where the storage capacity allocated to the namespace is small, the number of hierarchies of the namespace is small. On the other hand, in a case where the storage capacity allocated to the namespace is large, the number of hierarchies of the namespace is large. In the example illustrated in FIG. 7, the number of hierarchies in each of the namespaces NS1 to NSn is the same.

A range of the LBA is allocated to each of the plurality of first fragment tables T1, and the first fragment table T1 includes a plurality of elements C1. Each of the plurality of elements C1 is associated with the second fragment table T2 corresponding to the second hierarchy, and stores a pointer indicating the second fragment table T2.

Each of the plurality of second fragment tables T2 is allocated to the range of a LBA out of the range of LBAs, which is allocated to the first fragment table T1 higher than the second fragment table T2 (that is, the first fragment table T1 that stores a pointer indicating the second fragment table T2), and is further divided into m pieces. For example, m corresponds to the number of a plurality of elements C1 included in the first fragment table T1. Each of the second fragment tables T2 includes a plurality of elements C2. Each of the plurality of elements C2 is associated with the third fragment table T3 corresponding to the third hierarchy, and stores a pointer indicating the third fragment table T3.

Each of the plurality of third fragment tables T3 is allocated to the range of a LBA out of the range of LBAs, which is allocated to the second fragment table T2 higher than the third fragment table T3 (that is, the second fragment table T2 that stores a pointer indicating the third fragment table T3), and is further divided into 1 pieces. For example, 1 corresponds to the number of a plurality of elements C2 included in the second fragment table T2. Each of the third fragment tables T3 includes a plurality of elements C3. Each of the plurality of elements C3 is associated with the fourth fragment table T4 corresponding to the fourth hierarchy, and stores a pointer indicating the fourth fragment table T4.

Each of the plurality of fourth fragment tables T4 is allocated to the range of a LBA out of the range of LBAs, which is allocated to the third fragment table T3 higher than the fourth fragment table T4 (that is, the third fragment table T3 that stores a pointer indicating the fourth fragment table T4), and is further divided into k pieces. For example, k corresponds to the number of a plurality of elements C3 included in the third fragment table T3. The fourth fragment tables T4 includes a plurality of elements C4.

Here, in a case where the lowest hierarchy in the hierarchical structure of the LUT 41 is the fourth hierarchy as described above, each of the plurality of elements C4 included in the fourth fragment table T4 stores PBA corresponding to a LBA (that is, PBA to which the data accessed using the LBA is written).

In the LUT 41 having the hierarchical structure illustrated in FIG. 7 described above, the pointer stored in each of the elements C1 included in the first fragment table T1 corresponding to the first hierarchy indicates the second fragment table T2 corresponding to the second hierarchy, the pointer stored in each of the elements C2 included in the second fragment table T2 indicates the third fragment table T3 corresponding to the third hierarchy, the pointer stored in each of the elements C3 included in the third fragment table T3 indicates the fourth fragment table T4 corresponding to the fourth hierarchy, and the element C4 included in the fourth fragment table T4 stores the PBA corresponding to a LBA.

According to such a LUT 41, the PBA corresponding to the LBA can be designated by sequentially referring to the first fragment table T1 to the fourth fragment table T4 based on the LBA designated in various commands, for example.

Here, in the example illustrated in FIG. 7, the fourth fragment table T4 is a fragment table corresponding to the lowest hierarchy in the hierarchical structure of the LUT 41. In this case, each of the plurality of elements C4 included in the fourth fragment table T4 stores the PBA corresponding to a LBA as described above. In this case, assuming that the size of the data written in a PBA is 4 KiB and a fourth fragment table T4 includes 32 elements C4, a range of 32 LBAs (that is, LBAs for accessing 128 KiB of data) is allocated to a fourth fragment table T4 corresponding to the fourth hierarchy.

Similarly, assuming that a third fragment table T3 includes 32 elements C3, and a pointer indicating the fourth fragment table T4 to which LBAs are allocated to access 128 KiB of data is stored in each of the elements C3, a range of 32×32=1024 LBAs (that is, LBAs for accessing 4 MiB data) is allocated to a third fragment table T3 corresponding to the third hierarchy.

Further, assuming that a second fragment table T2 includes 32 elements C2, and a pointer indicating the third fragment table T3 to which LBAs are allocated to access the 4 MiB data is stored in each of the elements C2, a range of 1024×32=32768 LBAs (that is, LBAs for accessing 128 MiB data) is allocated to a second fragment table T2 corresponding to the second hierarchy.

In addition, assuming that a first fragment table T1 includes 32 elements C1, and a pointer indicating the second fragment table T2 to which LBAs are allocated to access 128 MiB data is stored in each of the elements C1, a range of 32768×32=1048576 LBAs (that is, LBAs for accessing 4 GiB data) is allocated to a first fragment table T1 corresponding to the first hierarchy.

That is, in the LUT 41 illustrated in FIG. 7, each of the first fragment tables T1 manages the LBA for accessing 4 GiB of data, each of the second fragment tables T2 manages the LBA for accessing 128 MiB data, each of the third fragment tables T3 manages the LBA for accessing 4 MiB data, and each of the fourth fragment tables T4 manages the LBA for accessing 128 KiB data.

In FIG. 7, an example in which the pointer is stored in each of the plurality of elements C1 included in the first fragment table T1 is illustrated; however, in a case where the plurality of second fragment tables T2 indicated by each of the pointers are continuously arranged in the non-volatile memory 4, the first fragment table T1 may be configured to store only a pointer indicating the first second fragment table T2 of the plurality of second fragment tables T2 (that is, configured to omit the pointer indicating the second fragment table T2 that is not the first). According to this, it is possible to reduce the size of the LUT 41. Here, the first fragment table T1 has been described, but the same applies to other fragment tables.

Further, in a case where the continuity of the PBA of the non-volatile memory 4 in which the data is written is guaranteed, the fragment table corresponding to the lower hierarchy can be omitted. Specifically, for example, the third fragment table T3 manages the LBA for accessing 4 MiB data, and in a case where the 4 MiB data accessed by the LBA managed by the third fragment table T3 is written in the continuous PBA, the element C2 included in the second fragment table T2 may store the first PBA in which the 4 MiB data is written, instead of the pointer indicating the third fragment table T3. According to this, since it is not necessary to refer to the third fragment table T3 and the fourth fragment table T4 lower than the second fragment table T2, the access speed for the data written in the non-volatile memory 4 can be improved.

Figure 8:
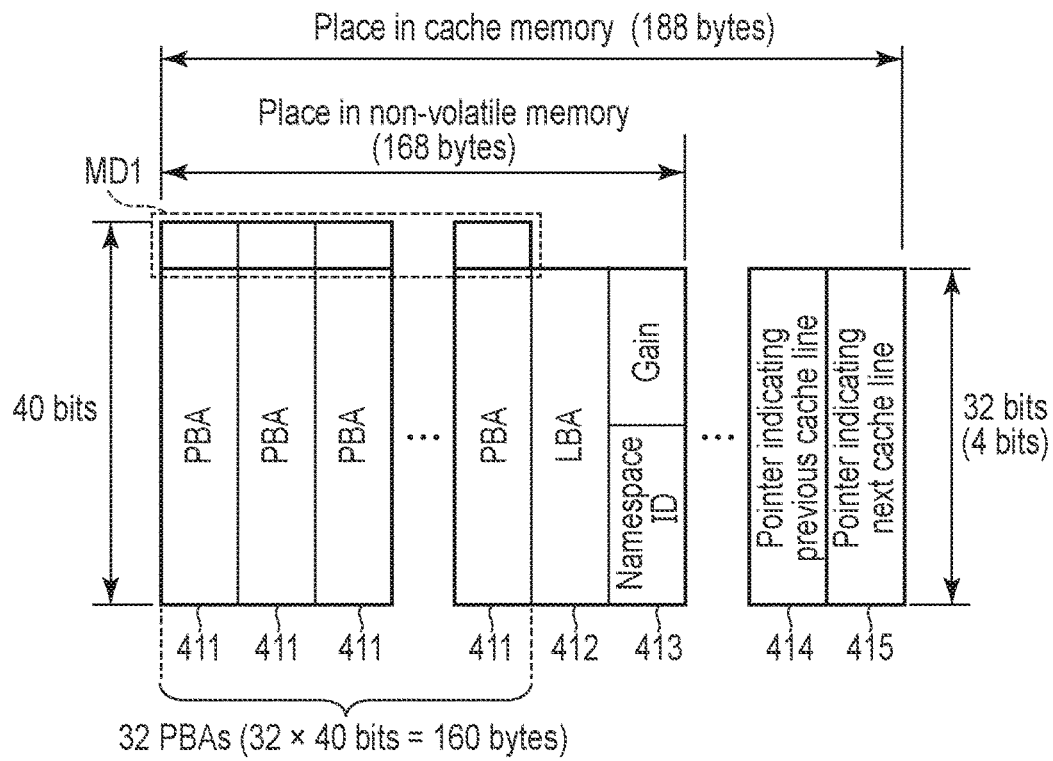
FIG. 8 is a diagram illustrating an example of a data structure of a fragment table included in LUT in the present embodiment.

FIG. 8 is a diagram illustrating an example of a data structure of a fragment table included in LUT 41 in the present embodiment. Here, the data structure of the first fragment table T1 will be mainly described.

The first fragment table T1 includes, for example, a plurality of PBA storing units 411, an LBA storing unit 412, and a management data storing unit 413.

The PBA storing unit 411 corresponds to the element C1 included in the first fragment table T1 described in FIG. 7. That is, the number of PBA storing units 411 is, for example, 32. The PBA storing unit 411 stores the PBA of the non-volatile memory 4 in which the second fragment table T2 is stored as a pointer indicating the second fragment table T2 corresponding to the lower hierarchy. In a case where the second fragment table T2 corresponding to the lower hierarchy is stored in the cache memory 551, the address of the cache memory 551 is stored in the PBA storing unit 411. The size of the PBA stored in the PBA storing unit 411 is, for example, 32 bits.

Further, for example, 8-bit management data MD1 may be attached to the PBA stored in the PBA storing unit 411. The management data MD1 is data for managing whether the PBA stored in the PBA storing unit 411 is the PBA of the non-volatile memory 4 or the address of the cache memory 551, for example.

In this case, each size of the PBA storing unit 411 is 40 bits, which is the sum of the size of the PBA (32 bits) and the size of the management data MD1 (8 bits), and the total size of the 32 PBA storing units 411 is 160 byte.

The LBA storing unit 412 stores the first LBA in the range of LBA allocated to the first fragment table T1.

The management data storing unit 413 stores a namespace ID for identifying the namespace to which the first fragment table T1 belongs and Grain corresponding to the range of LBA managed by the first fragment table T1 (LBA allocated to the first fragment table T1).

In addition, other information may be stored in the management data storing unit 413. Specifically, the management data storing unit 413 may store identification information (hierarchy ID) for identifying the hierarchy (first hierarchy) corresponding to the first fragment table T1, or the like.

Here, for example, when the LUT 41 is updated in the present embodiment, a part of the LUT 41 (fragment table to be updated) is stored in the cache memory 551. In this case, a part of the LUT41 is stored in a cache line unit. Further, a part of the LUT 41 updated in the cache memory 551 is written back to the non-volatile memory 4 in the cache line unit.

It is assumed that the first fragment table T1 is stored in the cache memory 551 for each cache line described above. Assuming that the first fragment table T1 stored in the cache memory 551 is LUT cache data, the LUT cache data further includes pointers indicating LUT cache data to be associated with each other in, for example, the cache memory 551 in addition to the PBA storing unit 411, the LBA storing unit 412, and the management data storing unit 413 described above.

Specifically, the LUT cache data includes a prior pointer storing unit 414 that stores a pointer indicating another LUT cache data referenced prior to the LUT cache data, and a next pointer storing unit 415 that stores a pointer indicating another LUT cache data referenced next to the LUT cache data.

By using the pointers to the LUT cache data before and after the LUT cache data should be referred to, the access to the cache memory 551 can be made speed up, and thereby continuous access can be realized. The LUT cache data may further include other management data.

As the pointers stored in the prior pointer storing unit 414 and the next storing storage unit 415, for example, a PBA in which other LUT cache data is stored is used, and an address in another format may be used.

Although the data structure of the table of the first fragment table T1 has been described in FIG. 8, the data structures of the other fragment tables (second fragment table T2 to fourth fragment table T4) are also as described in FIG. 8.

That is, in the present embodiment, each size of the first fragment table T1 to the fourth fragment table T4 has a fixed length such as 168 bytes, and each size of the LUT cache data stored in the cache memory 551 has a fixed length such as 188 bytes. The data structures of the first fragment table T1 to the fourth fragment table T4 and the LUT cache data may be different for each hierarchy, for example.

Further, in FIG. 8, it has been described that the pointer indicating the fragment table corresponding to the lower hierarchy is stored in the PBA storing unit 411, but in the case of the fourth fragment table T4, the PBA in which the data is written is stored in the PBA storing unit 411. As described above, even in a case of a fragment table other than the fourth fragment table T4, PBA may be stored in the PBA storing unit 411.

Figure 9:
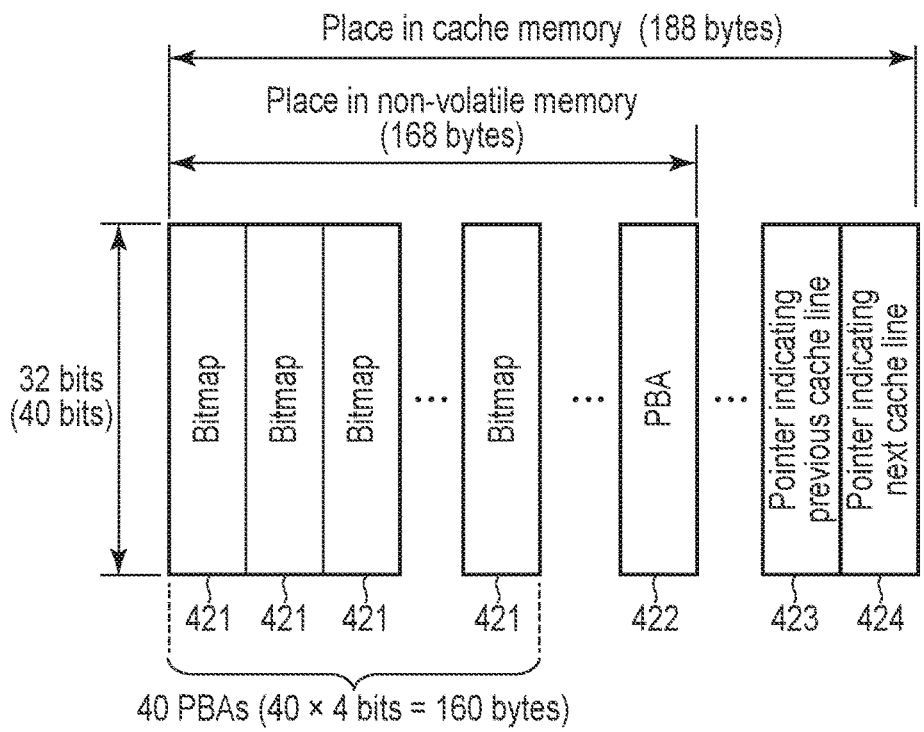
FIG. 9 is a diagram illustrating an example of an ADM data structure according to the present embodiment.

FIG. 9 is a diagram illustrating an example of a data structure of ADM 42 according to the present embodiment. FIG. 9 illustrates the ADM 42 prepared for a block (hereinafter, referred to as fragment ADM).

The fragment ADM includes a plurality of map storing units (bitmaps) 421 and a PBA storing unit 422.

The map storing unit 421 stores 1-bit flag information that manages the validity or invalidity of the 4 KiB data written in the non-volatile memory 4. For example, assuming that the fragment ADM includes 40 map storing units 421 and a map storing unit 421 stores 32 flag information (32 bits), the total size of the plurality of map storing units 421 is 160 bytes (=1280 bits), and a fragment ADM can manage the validity or invalidity of 1280 pieces of 4 KiB data written in the non-volatile memory 4.

The PBA storing unit 422 stores the first PBA in the range of PBAs managed by the fragment ADM.

Here, for example, when the ADM 42 is updated in the present embodiment, a part of the ADM 42 (fragment ADM to be updated) is stored in the cache memory 551, similar to the above described LUT 41. In this case, a part of the ADM 42 is stored in a cache line unit. Further, a part of the ADM 42 updated in the cache memory 551 is written back to the non-volatile memory 4 in the cache line unit.

It is assumed that the fragment ADM is stored in the cache memory 551 for each cache line described above. Assuming that the fragment ADM stored in the cache memory 551 is ADM cache data, the ADM cache data includes pointers indicating ADM cache data to be associated with each other in, for example, the cache memory 551 in addition to the map storing unit 421 and the PBA storing unit 422 described above.

Specifically, the ADM cache data includes a prior pointer storing unit 423 that stores a pointer indicating another ADM cache data referenced prior to the ADM cache data, and a next pointer storing unit 424 that stores a pointer indicating another ADM cache data referenced next to the fragment ADM.

Since the prior pointer storing unit 423 and the next pointer storing unit 424 are the same as the prior pointer storing unit 414 and the next pointer storing unit 415 illustrated in FIG. 8 described above, detailed description thereof will be omitted here.

Although the data structure of the fragment ADM prepared for a block has been described in FIG. 9, the data structure of the fragment ADM prepared for the other blocks is also as described in FIG. 9.

That is, in the present embodiment, each size of the fragment ADMs has a fixed length such as 168 bytes, and each size of the ADM cache data stored in the cache memory 551 has a fixed length such as 188 bytes.

The size of the fragment table (first fragment table T1 to fourth fragment table T4) described in FIG. 8 and the size of the fragment ADM described in FIG. 9 are the same as each other. Further, the size of the LUT cache data described in FIG. 8 and the size of the ADM cache data described in FIG. 9 are the same as each other.

Next, an example of the processing procedure of the memory system 3 when a Trim command is issued from the host 2 will be described with reference to the flowchart of FIG. 10.

First, for example, in a case where a predetermined file is deleted in a file system used by the host 2, the host 2 issues a Trim command for invalidating data corresponding to the file (hereinafter, referred to as target data). In this Trim command, LBA used to access the target data (hereinafter, referred to as the target LBA) is designated. The target LBA includes at least one LBA, and may be, for example, a continuous wide range of LBAs.

In a case where the Trim command is issued (transmitted) from the host 2 as described above, the communication interface control unit 51 receives the Trim command (step S31).

The Trim command received in step S31 is stored in a FIFO queue (hereinafter, referred to as a command queue) in which various commands from the host 2 are stored. As a result, a process for the Trim command received in step S31 (hereinafter, Trim process) is executed after the process for other commands received from the host 2 is executed prior to the Trim command. The command queue may be a queue other than the FIFO queue.

In a case where the Trim process is executed, the management unit 565 included in the processor 56 updates the LUT 41 based on the Trim command (target LBA), for example, by cooperating with the non-volatile memory controller 54 and the cache memory control unit 566 (step S32).

Here, in the present embodiment, the LUT 41 has a hierarchical structure and includes a plurality of fragment tables (first fragment table T1 to fourth fragment table T4) corresponding to each hierarchy. In this case, in step S32, one or more fragment tables to which the target LBA is allocated are specified by referring to the LUT 41, and the specified fragment table is read from the non-volatile memory 4 as needed. The fragment table read from the non-volatile memory 4 in this way is stored in the cache memory 551 and updated on the cache memory 551. In the case where the specified fragment table is already stored in the cache memory 551, it is not necessary to read the fragment table from the non-volatile memory 4. In this case, the PBA corresponding to the target LBA stored in the element (PBA storing unit 411) included in the fragment table is changed to the magic number. The fragment table updated in this way is read from the cache memory 551 and written back to the non-volatile memory 4. In step S32, the LUT 41 stored in the non-volatile memory 4 can be updated by executing such a process. The writing back to the non-volatile memory 4 may be executed at any timing after step S32.

When the process of step S32 is executed, the management unit 565 generates an invalidation request to update the ADM 42 based on the Trim command (target LBA) received in the step S31 (invalidates the data written in the non-volatile memory 4 on the ADM 42). The invalidation request generated in this way is stored (that is, queued) in the invalidation request queue 552 described above (step S33). As a result, the update of the ADM 42 is delayed. The invalidation request queued in step S33 includes the PBA corresponding to the target LBA (that is, the PBA of the non-volatile memory 4 in which the data to be invalidated by the Trim command is written). In the following description, the PBA included in the invalidation request queued in step S33 is referred to as a target PBA.

On the other hand, the management unit 565 transmits a Trim response (response to the Trim command) to the host 2 via the communication interface control unit 51 (step S34).

By the processes of steps S31 to S34 described above, the Trim response is returned to the host 2 after the LUT 41 is updated and before the ADM 42 is updated.

Figure 10:
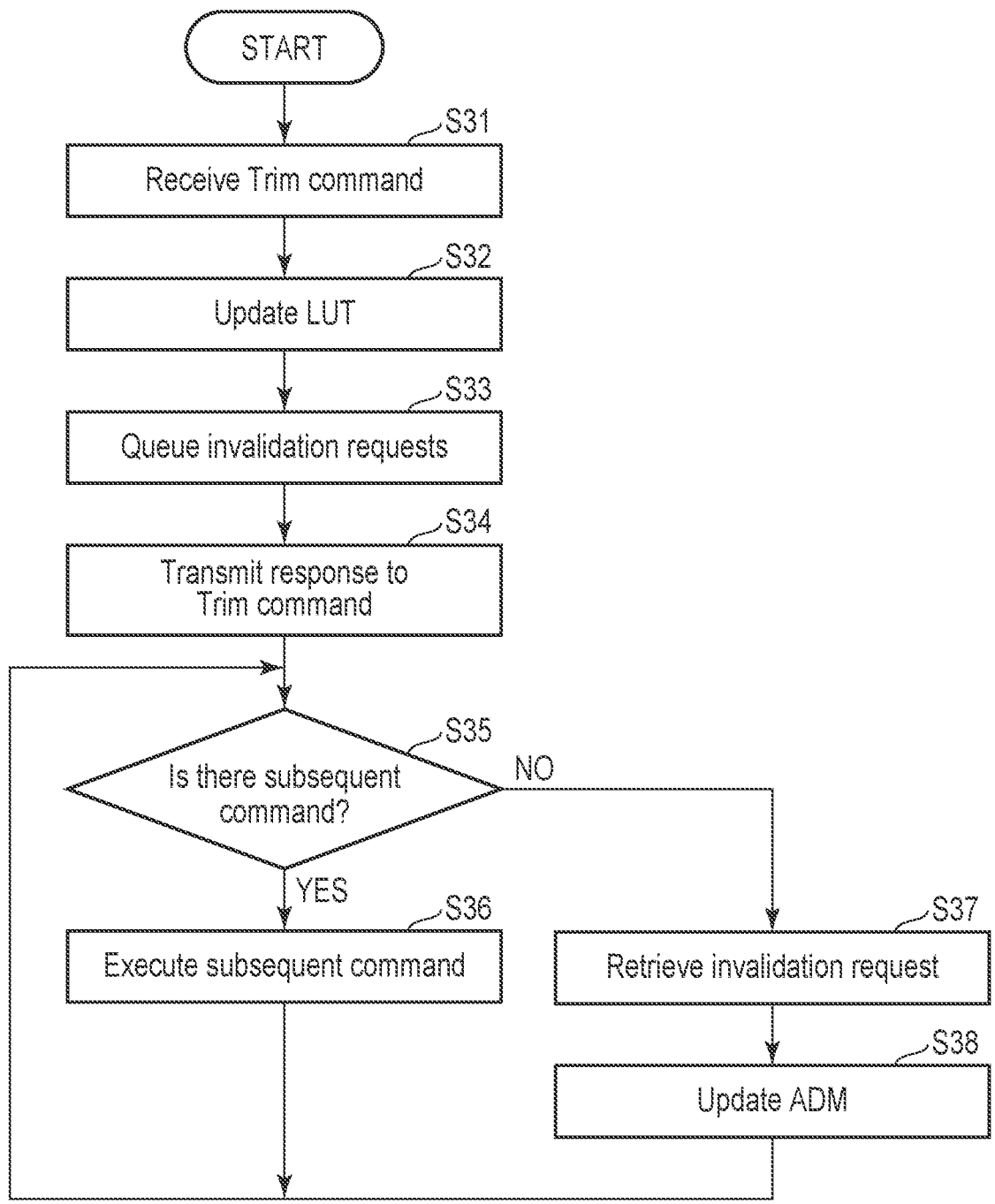
FIG. 10 is a flowchart illustrating an example of a processing procedure of the memory system according to the present embodiment when a Trim command is issued from a host.

Although it is illustrated in FIG. 10 that the processes are executed in the order of steps S32 to S34, the processes of steps S33 and S34 can be executed after the process of step S32. That is, the process of step S34 may be executed before the process of step S33, or the process of step S33 and the process of step S34 may be executed at the same time.

Here, in a case where a command other than the Trim command (hereinafter, referred to as a subsequent command) is received from the host 2 after the Trim command is received in step S31, the subsequent command is stored in the above command queue. Examples of the subsequent command include a write command, a read command, and a Trim command.

Therefore, in a case where the process of step S34 described above is executed, the management unit 565 refers to the command queue and determines whether or not there is a subsequent command (step S35).

In a case where it is determined that there is a subsequent command (YES in step S35), (process for) the subsequent command is executed (step S36). In a case where the subsequent command is a Trim command, the above steps S32 to S34 are executed. When the process of step S36 is executed, the process returns to step S35 and the process is repeated.

On the other hand, in a case where it is determined that there is no subsequent command (NO in step S35), the management unit 565 retrieves the invalidation request stored in the invalidation request queue 552 from the invalidation request queue 552 (step S37).

The management unit 565 updates the ADM 42 based on the invalidation request (target PBA) retrieved from the invalidation request queue 552 in step S37 by cooperating with the non-volatile memory controller 54 and the cache memory control unit 566 (step S38).

Here, in the present embodiment, the ADM 42 includes, for example, a plurality of fragment ADMs prepared for each block. In this case, in step S38, the fragment ADM that manages the validity or invalidity of the data stored in the target PBA is specified by referring to the ADM 42, and the specified fragment ADM is read from the non-volatile memory 4 as needed. The fragment ADM read from the non-volatile memory 4 in this way is stored in the cache memory 551 and updated on the cache memory 551. In the case where the specified fragment ADM is already stored in the cache memory 551, it is not necessary to read the fragment ADM from the non-volatile memory 4. In this case, the flag information corresponding to the target PBA among the flag information stored in the map storing unit 421 included in the fragment ADM is changed from "1" to "0". The fragment ADM updated in this way is read from the cache memory 551 and written back to the non-volatile memory 4. In step S38, the ADM 42 stored in the non-volatile memory 4 can be updated by executing such a process. The writing back to the non-volatile memory 4 may be executed at any timing after step S38.

Here, a subsequent command may be accepted while executing the update process of the ADM 42 based on an invalidation request. Therefore, when the process of step S38 is executed, the process returns to step S35 and the process is repeated. That is, if there is a subsequent command after the ADM 42 is updated in step S38, the subsequent command is executed. On the other hand, if there is no subsequent command after the ADM 42 is updated in step S38, the invalidation request is continuously retrieved. If there is no subsequent command or invalidation request, the process ends.

Next, a specific operation example of the memory system 3 when the Trim command is issued from the host 2 will be described with reference to FIG. 11. As described above, the LUT 41 and the ADM 42 in the present embodiment are updated on the cache memory 551, but the description of the cache memory 551 is omitted in the following description for convenience.

Here, it is assumed that 12 MiB data is written in the non-volatile memory 4 based on the write command in which LBA=0 is designated. Assuming that the size of the data written to the PBA corresponding to a LBA is 4 KiB as described above, the 12 MiB data corresponds to the data of 3072 sectors, and a range of the LBA for accessing the 12 MiB data is LBA #0 to LBA #3071. It is assumed that this 12 MiB data is written in continuous PBAs (that is, the continuity of PBAs is guaranteed). Specifically, it is assumed that the 12 MiB data is written in PBA #0 to PBA #3071.

In a case where the 12 MiB data is written in the non-volatile memory 4 as described above, the LUT 41 is updated according to the writing of the 12 MiB data.

Here, assuming that (the range of) LBA for accessing 4 GiB data is allocated to each of the plurality of first fragment tables T1 as described above, a first fragment table T11 shown in FIG. 11 indicates the first fragment table T1 to which the (range of) LBA for accessing the data of 4 GiB starting from LBA #0 is allocated among the plurality of first fragment tables T1.

In this case, a pointer 101 stored in the element C1 (PBA storing unit 411) included in the first fragment table T11 indicates a second fragment table T21 to which the (range) of LBA for accessing 128 MiB data starting from LBA #0 is allocated.

The size (12 MiB) of the data written in the non-volatile memory 4 is smaller than the size (128 MiB) of the data accessed using the LBA allocated to the second fragment table T21. Therefore, assuming that data other than the above-described 12 MiB data is not written in the non-volatile memory 4, a magic number (0xfe) is set in the other element C1 included in the first fragment table T11.

On the other hand, the (range of) LBA for accessing 4 MiB data is allocated to the third fragment table T3 corresponding to the lower hierarchy of the second fragment table T21, and the size (12 MiB) of the data written in the non-volatile memory 4 matches the size of three pieces of data accessed using the LBA allocated to the third fragment table T3.

Figure 11:
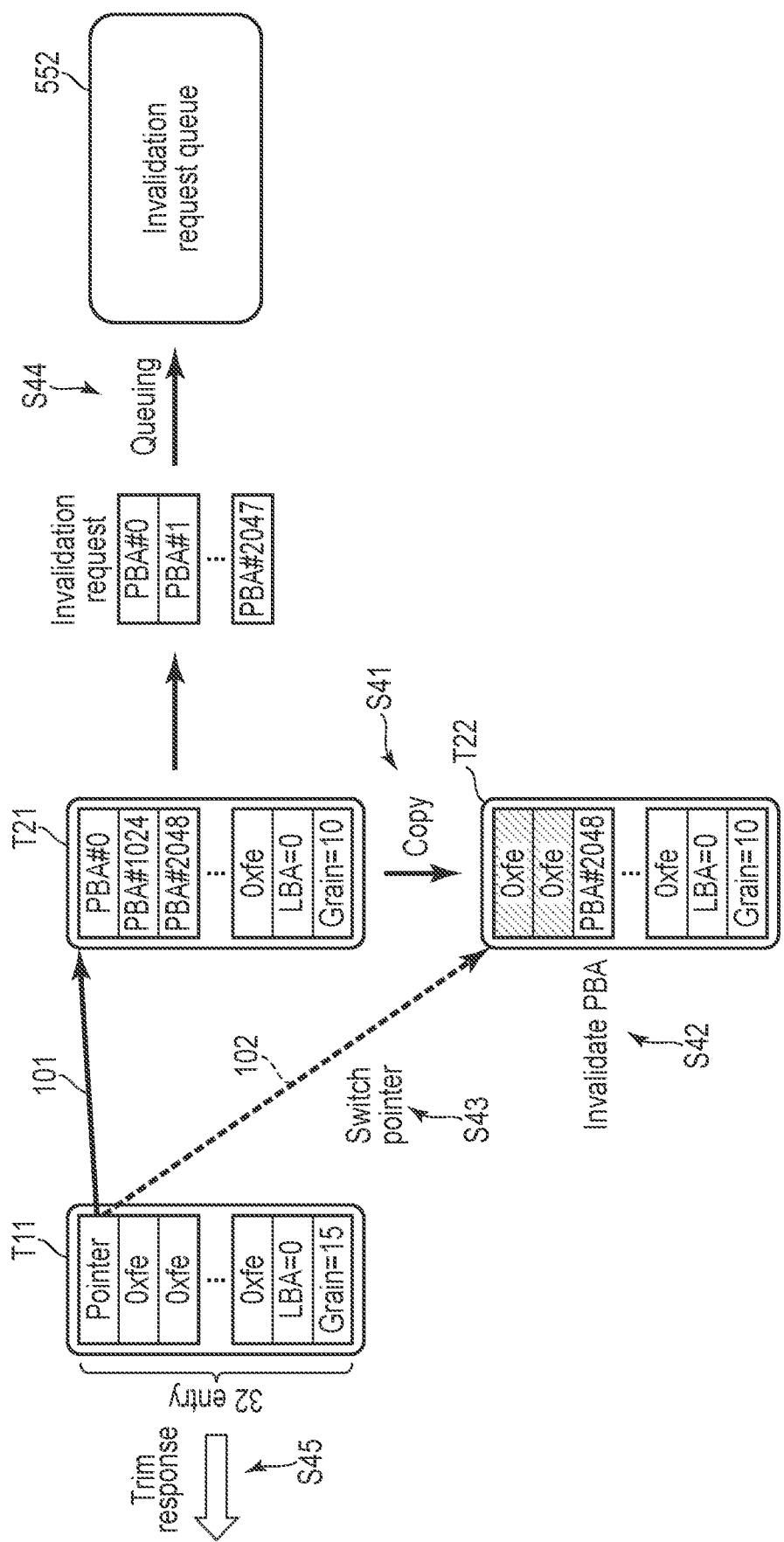
FIG. 11 is a diagram for explaining a specific operation example of the memory system according to the present embodiment when the Trim command is issued from the host.

In such a case, assuming that the continuity of the PBA in which the 12 MiB data is written is guaranteed as described above, the correspondence between the LBA and the PBA regarding the 12 MiB data can be managed only by the second fragment table T21 as illustrated in FIG. 11. That is, it is not necessary to arrange the third fragment table T3 and the fourth fragment table T4 under the second fragment table T21. In this case, the three elements C3 included in the second fragment table T21 each store the first PBA when the 4 MiB data is written in the non-volatile memory 4.

In the example illustrated in FIG. 11, PBA #0 is stored in the first element C2 included in the second fragment table T21. According to this, it is indicated that the data (first data) for 4 MiB out of the above 12 MiB data is written in the continuous PBA range (a region from PBA #0 to PBA #1023) starting from PBA #0.

In addition, PBA #1024 is stored in the second element C2 included in the second fragment table T21. According to this, it is indicated that the data (second data subsequent to the first data) for 4 MiB out of the above 12 MiB data is written in the continuous PBA range (a region from PBA #1024 to PBA #2047) starting from PBA #1024.

Similarly, PBA #2048 is stored in the third element C2 included in the second fragment table T21. According to this, it is indicated that the data (third data subsequent to the second data) for 4 MiB out of the above 12 MiB data is written in the continuous PBA range (a region from PBA #2048 to PBA #3071) starting from PBA #2048.

As described above, since the range of LBA for accessing 128 MiB data starting from LBA #0 is allocated to the second fragment table T21, according to such a second fragment table T21, the correspondence between LBA (LBA #0 to LBA #3071) and PBA (PBA #0 to PBA #3071) regarding 12 MiB data written in the non-volatile memory 4 can be managed without referring to the third fragment table T3 and the fourth fragment table T4.

In a case where the 12 MiB data is written in the non-volatile memory 4 as described above, the ADM 42 is also updated according to the writing of the 12 MiB data. Although detailed description is omitted here, in the ADM 42, the flag information corresponding to PBA #0 to PBA #3071 in which the 12 MiB data is written is changed from "0" to "1".

Next, it is assumed that 8 MiB data is invalidated based on the Trim command in which LBA=0 is designated while the 12 MiB data described above is written in the non-volatile memory 4. Assuming that the size of the data written to the PBA corresponding to a LBA is 4 KiB as described above, the 8 MiB data corresponds to the data of 2048 sectors, and the range of LBA for accessing the 8 MiB data (that is, the range of LBA contained in the Trim command) is LBA #0 to LBA #2047.

In this case, the management unit 565 specifies the second fragment table T21 to which the LBA is allocated based on the pointer 101 stored in the element C1 included in the first fragment table T11 to which the (range of) LBA for accessing the 8 MiB data starting from LBA #0 is allocated.

Next, the management unit 565 copies the contents of the second fragment table T21 to a working table having the same size as the designated second fragment table T21 (step S41).

The management unit 565 updates the entry of the work table (hereinafter, referred to as the second fragment table T22) to which the contents of the second fragment table T21 are copied, and invalidates PBA corresponding to the (range of) LBA for accessing to the 8 MiB data starting from LBA #0 designated in the Trim command (step S42). In this case, PBA #0 (that is, PBA #0 to PBA #1023 corresponding to LBA #0 to LBA #1023) and PBA #1024 (that is, PBA #1024 to PBA #2047 corresponding to LBA #1024 to LBA #2047) stored in element C2 included in the second fragment table T22 are changed to the magic number (0xfe). As a result, the 8 MiB data starting from LBA #0 is invalidated in the second fragment table T22.

Here, the pointer 101 stored in the element C1 included in the first fragment table T11 indicates the second fragment table T21, but the management unit 565 switches the pointer 101 to a pointer 102 indicating the second fragment table T22 (step S43). By switching the pointer in this way, it is possible to minimize the period in which the LUT 41 is inconsistent due to the update of the LUT 41.

As in the example illustrated in FIG. 11 above, in the case where the data is written to continuous PBAs, and the range of LBAs designated in the Trim command matches the range of LBAs (that is, a boundary of LUT41) allocated to the third fragment table T3, the PBA corresponding to a wide range of LBAs can be invalidated by simply updating the PBA stored in the element C2 included in the second fragment table T21 to the magic number. According to this, it is possible to update the LUT41 at a higher speed than the case where the PBA corresponding to a wide range of LBAs is individually changed to the magic number in the above-described single hierarchy LUT41'.

On the other hand, the management unit 565 generates an invalidation request including each of PBA #0 to PBA #2047 of the non-volatile memory 4 in which the 8 MiB data starting from LBA #0 designated in the Trim command is written, and stores the invalidation request in the invalidation request queue 552 (step S44).

Here, an example in which the invalidation request including all PBAs in which the data to be invalidated is written is queued (stored in the invalidation request queue 552) is described; however, in a case where a plurality of PBAs (PBAs targeted for Trim) in which the data to be invalidated by the Trim command is written are continuous, an invalidation request including the first PBA and the number of continuous PBAs may be queued. According to this, the invalidation request can be represented by a list of simple structures, and the amount of information of the invalidation request can be reduced. In a case where there is a PBA targeted for Trim (that is, in a case where the PBAs are not continuous), the number of continuous PBAs may be set to 1.

The Trim response is transmitted to the host 2 after the LUT 41 has been updated (step S45). Note that the update of ADM 42 based on (PBA included in) the queued invalidation request (invalidation of the data written in the PBA corresponding to the LBA designated in the Trim command) is executed after the transmission of the Trim response.

As described above, in the present embodiment, in the case where the Trim command (invalidation command) for invalidating the data written in the non-volatile memory is received from the host 2, the LUT41 (address translation table) and the ADM 42 (valid data map) are updated based on the Trim command, but the Trim response (response to the invalidation command) is transmitted to the host 2 after the LUT41 is updated and before the ADM 42 is updated.

In the present embodiment, the update of the ADM 42 is delayed, but the delayed execution of the update of the ADM 42 is realized by storing the invalidation request based on the Trim command in the invalidation request queue 552. In this case, the invalidation request is retrieved from the invalidation request queue 552 after the Trim response is transmitted to the host 2, and the ADM 42 is updated based on the invalidation request.

In the present embodiment, the Trim response is returned to the host 2 without updating the ADM 42 as described above. For example, in a case where a wide range of LBAs are designated in the Trim command, the response time to the Trim command can be shortened.

Further, in the present embodiment, in a case where a command other than the Trim command (subsequent command) is received from the host 2 after the Trim command, the other command can be executed after the Trim response is transmitted to the host 2. According to this, since it is possible to execute the subsequent command before the ADM 42 is updated, it is possible to avoid a delay in the process for the subsequent command.

The Trim command includes the LBA for accessing data to be invalidated by the Trim command, but other commands received from the host 2 may include at least one of a write command, a read command, and another Trim command that designates the LBA (logical address) included in the Trim command. That is, in the present embodiment, even if the subsequent command designates the LBA corresponding to the LBA range (Trim range) designated in the Trim command, it can be executed appropriately after the Trim response is transmitted to the host 2.

Here, in order to shorten the response time for the Trim command, for example, a configuration in which the entire Trim process (process for the Trim command) including the update of the LUT and ADM is delayed (hereinafter, referred to as a comparative example) can be considered. In that case, the Trim response will be transmitted to the host 2 before updating the LUT. In such a comparative example, after the Trim response is transmitted to the host 2 and before the LUT is updated, the subsequent command received from the host 2 may be executed, but when the subsequent command is executed, it is necessary to check whether the LBA designated in the subsequent command corresponds to the Trim range for each subsequent command (that is, consistency). That is, in the comparative example, the amount of calculation for maintaining consistency (consistency guarantee) according to whether or not the LBA designated in the subsequent command is the LBA for which the Trim process (LUT update) has been executed becomes large and has the a side effect of delaying the response to the subsequent command received from the host 2.

On the other hand, in the present embodiment, since the LUT 41 is configured to complete the update before the Trim response (that is, the Trim response is transmitted while guaranteeing the consistency of the LUT 41), there is no need to check the consistency for each subsequent command.

Further, in the present embodiment, the update of the ADM 42 is delayed, and even if the update of the ADM 42 is delayed, for example, block-free by garbage collection is only delayed, so that the above-described side effects are not affected.

On the other hand, the delay of block-free can cause a delay for the write command, but the degree of influence according to a workload of the host 2 may be controlled by, for example, setting a variable threshold value for discriminating the timing to start updating the ADM 42. For example, in a case of a workload that writes a certain amount of data on a regular basis, by setting a threshold value that maintains free blocks in which the amount of data can be written, it is possible to execute control so that the block-free is not performed when the write command is executed based on the threshold value.

Further, in the present embodiment, the update of the LUT 41 is executed before the Trim response is transmitted to the host 2. However, in order to further shorten the response time for the Trim command, there is a need to execute the update of the LUT 41 at a higher speed.

On the other hand, in the present embodiment, by employing the LUT 41 having a hierarchical structure, the LUT 41 can be updated at high speed, so that further shortening of the response time can be realized.

Further, when updating the LUT 41, the LUT 41 may be cached from the non-volatile memory 4 to the cache memory 551, but in the present embodiment, so that the fragment table is cached in the cache memory 551 due to the configuration in which the LUT 41 has a hierarchical structure, it is possible to reduce the size of the data cached from the non-volatile memory 4 to the cache memory 551. According to this, the time required for reading the LUT 41 from the non-volatile memory 4 can be shortened, and the search for the LUT 41 can be made more efficient, and the access speed can be increased.

In the present embodiment, even in a case where the LUT having no hierarchical structure is employed as described above, it is possible to shorten the response time for the Trim command, but in this case, the process described in the present embodiment may be executed by using a part of the LUT as fragment data.

Here, the queuing of the invalidation request in the present embodiment may be performed at the same time as the transmission of the Trim response, or may be performed before or after the transmission of the Trim response.

However, in a case where the queuing of the invalidation request is performed at the same time as, for example, the transmission of the Trim response or before the transmission of the Trim response, the queuing of the invalidation request (or the process of generating the invalidation request) may affect the response speed for the Trim command. Therefore, in the present embodiment, it is preferable to perform the queuing of the invalidation request at high speed.

Figure 12:
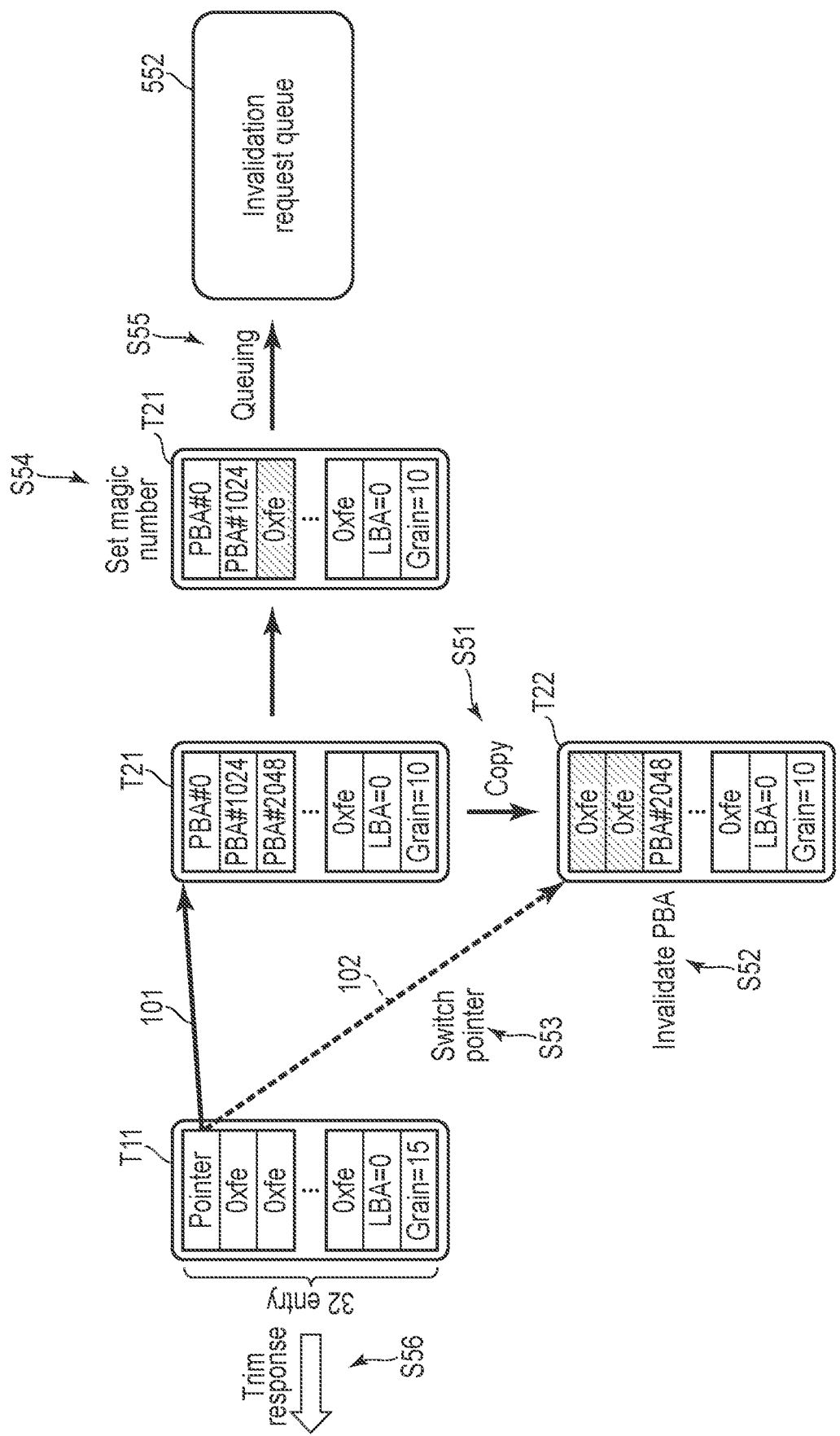
FIG. 12 is a diagram for explaining the operation of the memory system according to a modified example of the present embodiment.

Therefore, an operation of a memory system 3 according to the modified example of the present embodiment for queuing an invalidation request at high speed will be described with reference to FIG. 12. In the description of FIG. 12, regarding the same parts as those in FIG. 11, detailed description is omitted, and the parts different from FIG. 11 are mainly described.

First, as in FIG. 11, 12 MiB data is written in the non-volatile memory 4 based on the write command with LBA=0 designated, and the LUT 41 is assumed to include the first fragment table T11 corresponding to the first hierarchy and the second fragment table T21 corresponding to the second hierarchy.

Next, it is assumed that 8 MiB data is invalidated based on the Trim command in which LBA=0 is designated while the 12 MiB data described above is written in the non-volatile memory 4.

In this case, the LUT 41 is updated by executing the processes of steps S51 to S53 corresponding to the processes of steps S41 to S43 illustrated in FIG. 11.

Next, the invalidation request for invalidating the 8 MiB data starting from LBA #0 designated in the Trim command in the ADM 42 is generated, but in the modified example of the present embodiment, fragment data included in the LUT41 is used as the invalidation request.

Specifically, in the example illustrated in FIG. 12, the second fragment table T21 separated from (pointer stored in the element C1 included in) the first fragment table T11 is used as the invalidation request.

Since the range of PBA to be invalidated is unknown only from this second fragment table T21, discrimination information for discriminating the data (PBA) to be invalidated by the Trim command is given to the second fragment table T21.

The discrimination information given to the second fragment table T21 includes, for example, a magic number, and the magic number is set in the element C2 (PBA storing unit 411) of the second fragment table T21 (step S54). Here, since the (range of) LBA designated in the Trim command is LBA #0 to LBA #2047, the magic number (0xfe) is set in the element C2 where PBA #2048 of the second fragment table T21 is stored (that is, PBA #2048 has been changed to a magic number). According to this, by setting the PBA that does not need to be invalidated as the magic number, it can be discriminated that PBA #0 (to PBA #1023) and PBA #1024 (to PBA #2047) stored in the element C2 included in the second fragment table T21 are the PBAs to be invalidated.

Among the elements C2 included in the second fragment table T21, in the element C2 for which the magic number has already been set, the magic number may be maintained.

In the modified example of the present embodiment, an invalidation request including such a second fragment table T21 is queued (step S55).

Note that, the invalidation request queued in step S55 merely includes the second fragment table T21, and regarding the specific PBA in which the data to be invalidated in the invalidation request is written, with reference to the above-described discrimination information (magic number), the determination is made when the invalidation request is executed (when the ADM 42 update is delayed). According to this, the invalidation request can be queued at high speed, and the data stored in the PBA corresponding to the Trim range can be appropriately invalidated by executing the invalidation request.

Since step S56 illustrated in FIG. 12 corresponds to step S45 illustrated in FIG. 11, detailed description thereof will be omitted here.

The magic number set in the second fragment table T21 included in the invalidation request may be the same as or different from the magic number used in the fragment table (for example, the first fragment table T11) included in the LUT 41, for example. In the present embodiment, it is mainly described that "0xfe" is used as the magic number, but other than the "0xfe" may be used as the magic number.

Further, in FIG. 12, the discrimination information given to the second fragment table T21 has been described as being a magic number, but the discrimination information may be in the range of LBA designated in the Trim command. The range of this LBA includes, for example, the first LBA and the number (length) of the LBA, but may be of another form.

Here, in FIG. 12, the case where the invalidation request including a fragment table (second fragment table T21) is queued has been described, but the invalidation request including a plurality of fragment tables may be queued depending on the Trim range.

Hereinafter, the operation of the memory system 3 when the invalidation request including a plurality of fragment tables is queued will be briefly described with reference to FIG. 13.

Here, it is assumed that 10 MiB data is written in the non-volatile memory 4 based on the write command in which LBA=0 is designated. In this case, the 10 MiB data corresponds to the data of 2560 sectors, and a range of the LBA for accessing the 10 MiB data is LBA #0 to LBA #2559.

Regarding LBA #0 to LBA #2047 among LBA #0 to LBA #2559, it is possible to manage the correspondence between LBA and PBA in the second fragment table T21 as described in FIG. 11 and the like above. However, the remaining LBA #2048 to LBA #2559 do not match the range of LBA allocated to the third fragment table T31 corresponding to the hierarchy lower than the second fragment table T21. In this case, there is a need to manage the correspondence between LBA #2048 to LBA #2559 and PBA in the third fragment table T31 indicated by the pointer stored in the element C2 included in the second fragment table T21 as illustrated in FIG. 13.

Here, it is assumed that 9 MiB data of is invalidated based on the Trim command in which LBA=0 is designated while the 10 MiB data described above is written in the non-volatile memory 4. In this case, the 9 MiB data corresponds to the data of 2304 sectors, and a range of the LBA for accessing the 9 MiB data is LBA #0 to LBA #2303.

In this case, the second fragment table T21 and the third fragment table T31 are copied to the working table, respectively, and in the working table (second fragment table T22 and third fragment table T32), the PBA corresponding to the range of LBA for accessing 9 MiB data (that is, LBA #0 to LBA #2303) starting from LBA #0 is invalidated.

In a case where such a process is executed, the pointer stored in the element C1 included in the first fragment table T11 (pointer indicating the second fragment table T21) is switched to a pointer indicating the second fragment table T22. In addition, the element C2 included in the second fragment table T22 stores a pointer indicating the third fragment table T32. With this, the update of LUT41 is completed.

Figure 13:
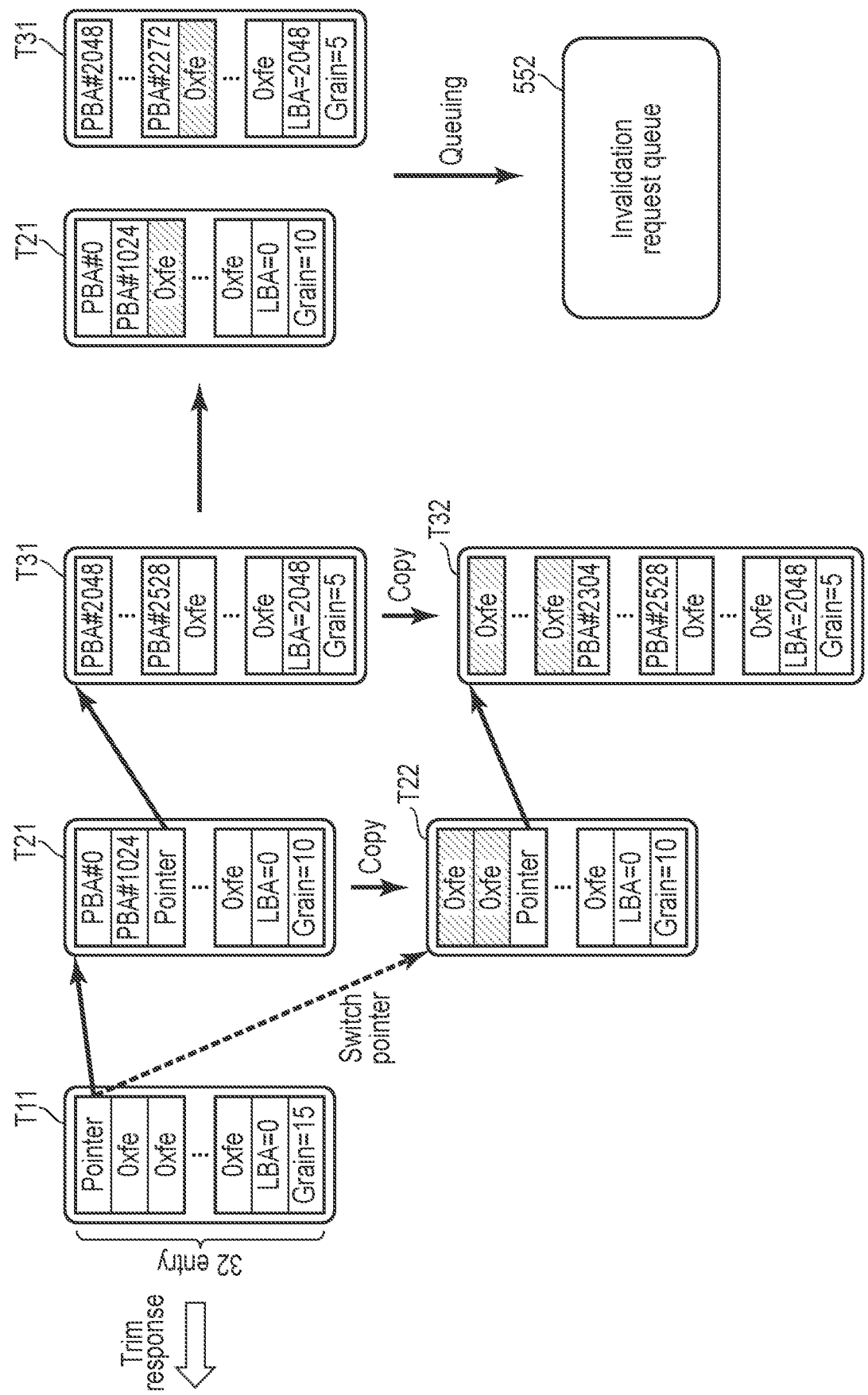
FIG. 13 is a diagram for explaining the operation of the memory system according to the modified example of the present embodiment when an invalidation request including a plurality of fragment tables is queued.

On the other hand, in the case where the LUT 41 is updated as described above, the invalidation request including the second fragment table T21 and the third fragment table T31 is queued as illustrated in FIG. 13. A magic number is set as discrimination information in the second fragment table T21 and the third fragment table T31.

In the case where such an invalidation request is executed, the ADM 42 may be updated based on each of the second fragment table T21 and the third fragment table T31 included in the invalidation request.

Although the differences from FIG. 12 have been mainly described in FIG. 13, an operation example of a memory system 3 illustrated in FIG. 13 is substantially the same as the operation of the memory system 3 described with reference to FIG. 12 except that the third fragment table T3 is used in addition to the second fragment table T2, and thus detailed description of the points overlapping with those in FIG. 12 will be omitted.

As described above, in the modified example of the present embodiment, the fragment table corresponding to the update of the LUT 41 (and the fragment table corresponding to the lower hierarchy of the fragment table) may be removed from the LUT 41 and used as an invalidation request.

Next, an operation example when executing the invalidation request stored in the invalidation request queue 552 will be described.

Figure 14:
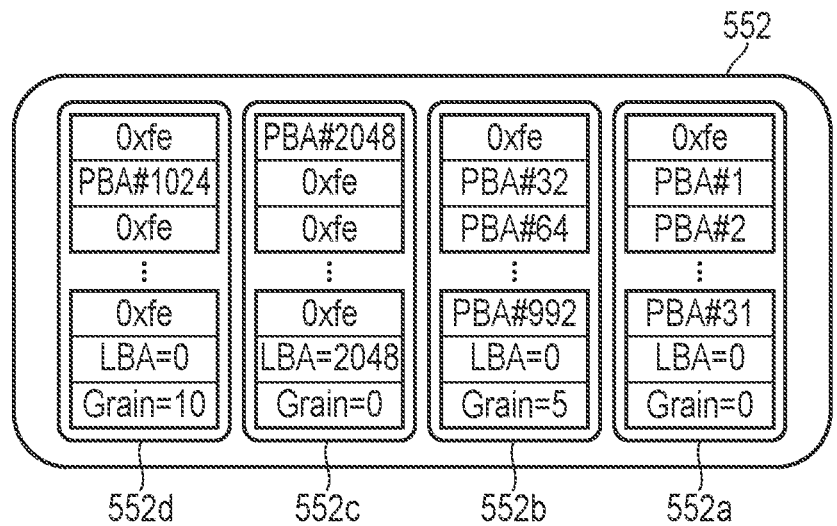
FIG. 14 is a diagram for explaining a specific operation example when executing the invalidation request stored in an invalidation request queue in the modified example of the present embodiment.

Here, as illustrated in FIG. 14, it is assumed that a plurality of invalidation requests 552a to 552d are stored in the invalidation request queue 552. The plurality of invalidation requests 552a to 552d are invalidation requests queued by receiving different Trim commands, and the invalidation requests 552a to 552d each include a fragment table. The plurality of invalidation requests 552a to 552d illustrated in FIG. 14 may be invalidation requests queued by receiving a Trim command.

In FIG. 14, the fragment table included in the invalidation request 552a is the fourth fragment table T4, the fragment table included in the invalidation request 552b is the third fragment table T3, the fragment table included in the invalidation request 552c is the fourth fragment table T4, and the fragment table included in the invalidation request 552d is the second fragment table T2.

Here, it is assumed that the invalidation request queue 552 is a FIFO queue, and the invalidation requests 552a to 552d are stored in the invalidation request queue 552 in the order of the invalidation requests 552a to 552d.

Figure 15:
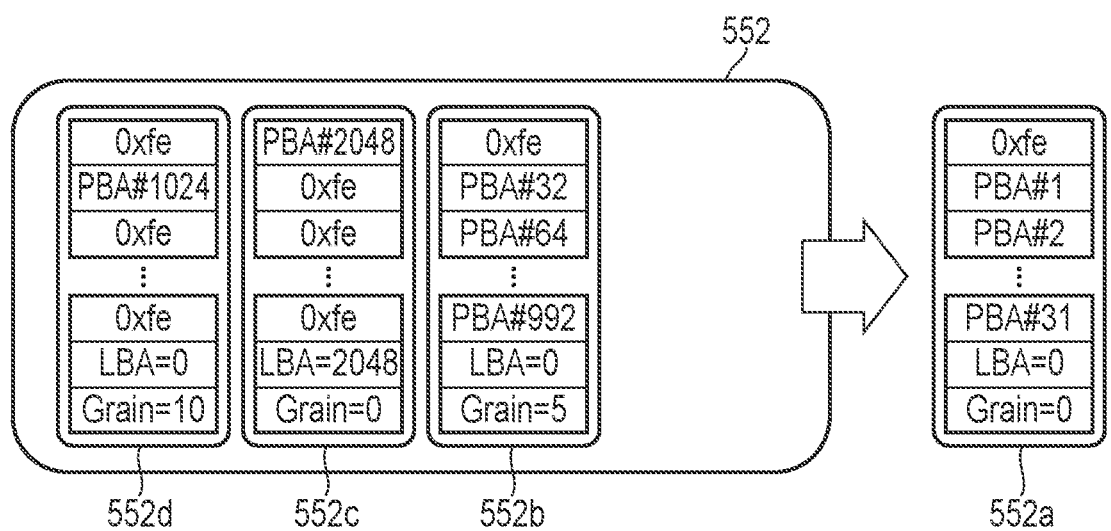
FIG. 15 is a diagram for explaining a specific operation example when executing the invalidation request stored in an invalidation request queue in the modified example of the present embodiment.

In this case, the management unit 565 retrieves the invalidation request 552a from the invalidation request queue 552 and executes the invalidation request 552a as illustrated in FIG. 15. In this case, the invalidation request 552a includes the fourth fragment table T4 as described above, an element C4 included in the fourth fragment table T4 has a magic number set, and PBA #1, PBA #2, . . . , and PBA #31 are stored in other 31 elements C4. According to (invalidation request 552a including) such a fourth fragment table T4, the flag information corresponding to PBA #1 to PBA #31 on the ADM 42 is changed from "1" to "0".

Figure 16:
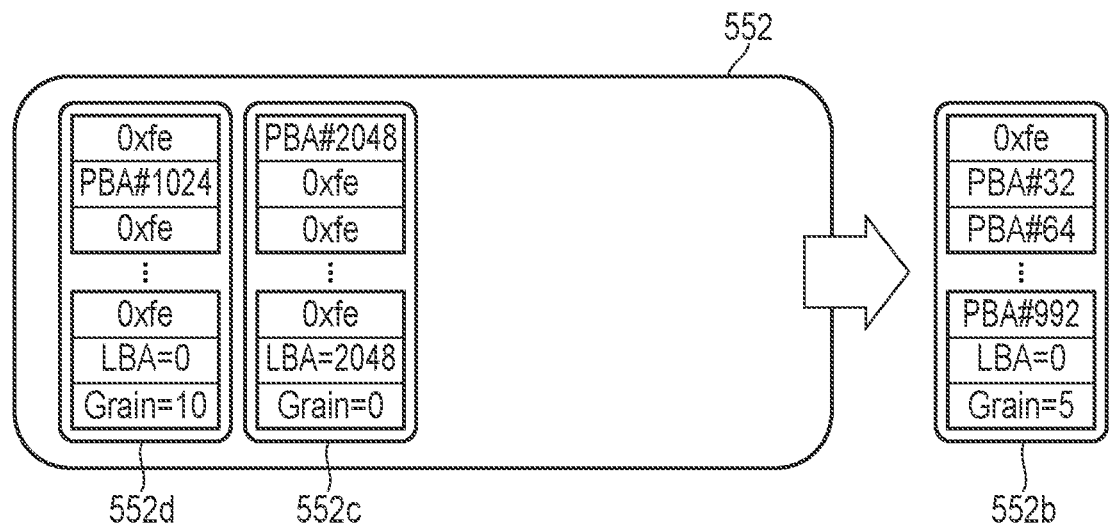
FIG. 16 is a diagram for explaining a specific operation example when executing the invalidation request stored in an invalidation request queue in the modified example of the present embodiment.

In a case where the invalidation request 552a is executed, the management unit 565 retrieves the invalidation request 552b from the invalidation request queue 552 and executes the invalidation request 552b as illustrated in FIG. 16. In this case, the invalidation request 552b includes the third fragment table T3 as described above, an element C2 included in the third fragment table T3 has a magic number set, and PBA #32, PBA #64, . . . , and PBA #992 are stored in other 31 elements C3. According to (invalidation request 552b including) such a third fragment table T3, the flag information corresponding to PBA #32 to PBA #1023 on the ADM 42 is changed from "1" to "0".

Figure 17:
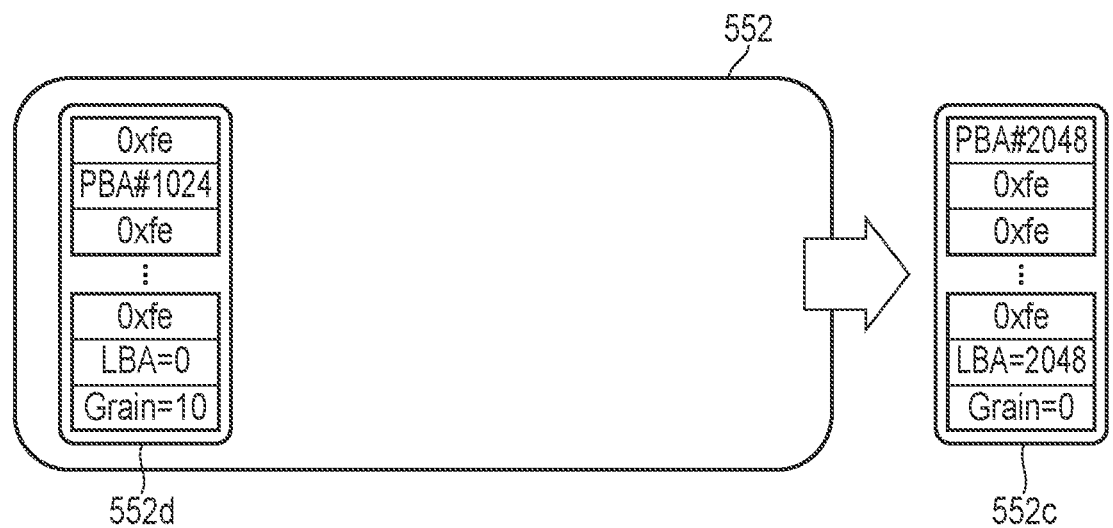
FIG. 17 is a diagram for explaining a specific operation example when executing the invalidation request stored in an invalidation request queue in the modified example of the present embodiment.

In a case where the invalidation request 552b is executed, the management unit 565 retrieves the invalidation request 552c from the invalidation request queue 552 and executes the invalidation request 552c as illustrated in FIG. 17. In this case, the invalidation request 552c includes the fourth fragment table T4 as described above, an element C4 included in the fourth fragment table T4 stores PBA #2048, and other 31 elements C4 has a magic number set. According to (invalidation request 552c including) such a fourth fragment table T4, the flag information corresponding to PBA #2048 on the ADM 42 is changed from "1" to "0".

In a case where the invalidation request 552c is executed, the management unit 565 retrieves the invalidation request 552d from the invalidation request queue 552 and executes the invalidation request 552d as illustrated in FIG. 18. In this case, the invalidation request 552d includes the second fragment table T2 as described above, an element C2 included in the second fragment table T2 stores PBA #1024, and other 31 elements C2 has a magic number set. According to (invalidation request 552d including) such a second fragment table T2, the flag information corresponding to PBA #1024 to PBA #2047 on the ADM 42 is changed from "1" to "0".

In the case where the invalidation request queue 552 is the FIFO queue as described above, the invalidation requests are sequentially executed in the order of being stored (that is, queued) in the invalidation request queue 552. In a case where another command is received from the host 2 while the above-described invalidation requests 552a to 552d are executed, the command is executed in preference to the invalidation requests 552a to 552d.

In this regard, in the above-described modified example of the present embodiment, the invalidation request includes a fragment table, but the range of data (PBA) invalidated based on the invalidation request according to the hierarchy corresponding to the fragment table is different. Specifically, in the case where the invalidation request 552a is executed, (data written in) 31 PBAs can be invalidated on the ADM 42. In addition, in the case where the invalidation request 552b is executed, (data written in) 992 PBAs can be invalidated on the ADM 42. In addition, in the case where the invalidation request 552c is executed, (data written in) one PBA can be invalidated on the ADM 42. Further, in the case where the invalidation request 552d is executed, (data written in) 1024 PBAs can be invalidated on the ADM 42.

That is, in the modified example of the present embodiment, it is better to update the ADM 42 based on the invalidation request including the fragment table corresponding to the higher hierarchy, and invalidate a wider range of PBAs with a smaller processing amount (processing cost).

Therefore, in the modified example of the present embodiment, for example, among the plurality of invalidation requests stored in the invalidation request queue 552, the invalidation request including the fragment table whose hierarchy is higher may be preferentially executed. In other words, in the modified example of the present embodiment, the priority control for a plurality of invalidation requests stored in the invalidation request queue 552 may be executed.

Although the case of controlling the priority for the invalidation request based on the hierarchy corresponding to the fragment table included in the invalidation request has been described here, for example, a dedicated command for giving a priority to a predetermined invalidation request may be prepared in advance. Specifically, the invalidation request designated by such a dedicated command (that is, the invalidation request with a high priority) is stored in the high priority queue, and the invalidation request stored in the high priority queue may be executed in preference to other invalidation requests (for example, invalidation requests stored in the low priority queue).

In addition, the invalidation requests stored in the invalidation request queue 552 may be executed in no particular order, and for example, a process of changing the order of the invalidation requests that are queued may be periodically executed.

As described above, in the modified example of the present embodiment, (fragment table included in) the LUT 41 is updated before the Trim response is transmitted to the host 2, and the invalidation request including the fragment table before the update is queued.

According to the configuration in which the fragment table included in the LUT 41 is used as the invalidation request, for example, as illustrated in FIG. 11 above, it is possible to reduce the number of memory copies and calculation processing amount when queuing the invalidation request as compared with the case where the invalidation request including all the PBAs in which the data to be invalidated is written is queued.

Therefore, in the modified example of the present embodiment, since the queuing of the invalidation request can be performed at high speed, for example, in a case of a configuration in which the Trim response is performed at the same time as the queuing of the invalidation request or before the queuing, the response time for the Trim command can be further shortened.

Since the fragment table used for the invalidation request in the modified example of the present embodiment is separated from the LUT 41, even if the fragment table is used for the invalidation request, the data consistency with respect to the host 2 is not affected.

Further, in the modified example of the present embodiment, discrimination information for discriminating the data to be invalidated is given to the fragment table included in the invalidation request, so that it is possible to update the ADM 42 to invalidate data (the PBA to which the data is written) in an appropriate range based on the discrimination information.

A magic number can be used as the discrimination information. In this case, by setting the magic number in the fragment table included in the invalidation request, the size of the fragment table can be maintained in the invalidation request (that is, there is no need to make the invalidation request larger than the fragment table). In a case of a configuration in which the magic number is not used, (range of) the LBA designated in the Trim command may be given to the fragment table as discrimination information.

Further, in a case where the Trim range and the boundary of the LUT 41 do not match in the modified example of the present embodiment, the invalidation request including a plurality of fragment tables is stored in the invalidation request queue 552. With such a configuration, it is possible to queue an appropriate invalidation request without depending on the Trim range. On the other hand, in a case where the Trim range matches the boundary of LUT41, the invalidation request including only a fragment table corresponding to the upper hierarchy may be queued.

Further, in the modified example of the present embodiment, in a case where a plurality of invalidation requests (fragment tables) are stored in the invalidation request queue 552, priority control for the plurality of invalidation requests may be executed. Specifically, for example, the ADM 42 may be preferentially updated based on an invalidation request including a fragment table whose hierarchy is higher. With such a configuration, it is possible to efficiently invalidate a wider range of PBAs, and it becomes easy to generate continuous free blocks.

Note that, the priority control for a plurality of invalidation requests may be executed by using a dedicated command. According to this, it is possible to preferentially execute the update of ADM 42 based on the invalidation request designated by the dedicated command.

Here, it is preferable to make the invalidation request non-volatile in order to reliably update the ADM 42 based on the Trim command. In this case, flag information indicating that non-volatility is required for the invalidation request for which the update of ADM 42 has not been executed is given, and in a case where the number of data requiring non-volatilization exceeds the predetermined value, by writing the data to the non-volatile memory 4, it is possible to realize the non-volatility of the invalidation request. According to this, it is possible to suspend and resume the execution of the invalidation request (update of ADM 42).

However, since the non-volatility is not essential in the case where the execution of the invalidation request is not interrupted, the process of writing the invalidation request to the non-volatile memory 4 is wasted. Therefore, for example, by giving the invalidation request information indicating that it is an invalidation request, the invalidation request may not be written in the non-volatile memory 4 (that is, the invalidation request is suppressed from being written in the non-volatile memory 4).

Further, in a case where garbage collection is executed on the block including the PBA corresponding to the Trim range before the ADM 42 update is executed based on the invalidation request, the data written to the PBA may be moved to other blocks and other valid data may be written to the PBA. In a case where the ADM 42 is updated based on the invalidation request after such valid data has been written, the valid data (the PBA in which the valid data is written) will be unintentionally invalidated.

For this reason, the block including the PBA whose data to be invalidated based on the invalidation request (that is, unexecuted) stored in the invalidation request queue 552 may not be subject to garbage collection (that is, a block that is not the target of the invalidation request is selected as a source block of the garbage collection).

However, in this case, the garbage collection is to wait until the invalidation request is executed in some cases, which may hinder the efficient operation of an information processing system 1 (memory system 3).

For this, a configuration of using a serial number (sequence number) called Erase Serial managed in the memory system 3 (SSD) may be used. According to this Erase Serial, the generation of data written in the non-volatile memory 4 can be managed by adding 1 each time the data written in the non-volatile memory 4 is erased (that is, the Erase command is executed).

In the modified example of the present embodiment, such an Erase Serial may be given to the fragment data included in the invalidation request. According to this, when updating ADM 42 based on the invalidation request, by comparing the Erase Serial given to the fragment table included in the invalidation request with the Erase Serial managed in the memory system 3, it can be determined whether or not the data to be invalidated has already been erased (or rewritten to valid data) based on the invalidation request. In a case where it is determined that the data to be invalidated has already been erased based on the invalidation request, the invalidation request may be discarded. On the other hand, in a case where it is determined that the data to be invalidated has not been erased based on the invalidation request, the ADM 42 may be updated based on the invalidation request.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system that is connectable to a host,
    a non-volatile memory; and
    a controller configured to be electrically connected to the non-volatile memory to control the non-volatile memory,
    wherein the non-volatile memory is configured to store
    an address translation table for managing a correspondence between a logical address used by the host to access the memory system and a physical address in which data in the non-volatile memory is written, and
    a data map for managing whether the data written in the non-volatile memory is valid or invalid,
    in a case where an invalidation command for invalidating the data written in the non-volatile memory is received from the host, the controller is configured to update the address translation table and the data map based on the invalidation command,
    a response to the invalidation command is transmitted to the host after the address translation table is updated and before the data map is updated, the controller is configured to store an invalidation request based on the invalidation command in a queue, retrieve the invalidation request from the queue after the response to the invalidation command is transmitted to the host, and update the data map based on the invalidation request, the address translation table comprises a plurality of fragment tables, a range of logical address is allocated to each of the fragment tables, the invalidation command comprises a logical address for accessing data to be invalidated by the invalidation command, the controller is configured to update the fragment table specified based on the logical address in the invalidation command among the fragment tables, and the invalidation request comprises a fragment table before being updated.

2. The memory system according to claim 1, wherein discrimination information for discriminating data to be invalidated by the invalidation command is given to the fragment table in the invalidation request.

3. The memory system according to claim 2,
wherein the discrimination information comprises a magic number, and
the magic number is set in the fragment table in the invalidation request.

4. The memory system according to claim 2, wherein the discrimination information comprises a range of logical addresses in the invalidation command.

5. The memory system according to claim 1, wherein
the data map is used to specify the data to be moved when garbage collection is executed, and
the data map includes flag information which indicates whether the data stored in each physical address corresponding to the flag information is valid or invalid.

6. The memory system according to claim 1,
wherein other commands received from the host after the invalidation command are executed in preference to the invalidation request, and
the controller is configured to retrieve the invalidation request from the queue after the other commands are executed and update the data map based on the invalidation request.

7. The memory system according to claim 6, wherein the address translation table has a hierarchical structure and comprises a plurality of fragment tables corresponding to a plurality of hierarchies.

8. The memory system according to claim 1, wherein the address translation table has a hierarchical structure and comprises a plurality of fragment tables corresponding to a plurality of hierarchies.

9. A memory system that is connectable to a host,
a non-volatile memory; and
a controller configured to be electrically connected to the non-volatile memory to control the non-volatile memory,
wherein the non-volatile memory is configured to store
an address translation table for managing a correspondence between a logical address used by the host to access the memory system and a physical address in which data in the non-volatile memory is written, and
a data map for managing whether the data written in the non-volatile memory is valid or invalid,
in a case where an invalidation command for invalidating the data written in the non-volatile memory is received from the host, the controller is configured to update the address translation table and the data map based on the invalidation command, and
a response to the invalidation command is transmitted to the host after the address translation table is updated and before the data map is updated,
the controller is configured to store an invalidation request based on the invalidation command in a queue, retrieve the invalidation request from the queue after the response to the invalidation command is transmitted to the host, and update the data map based on the invalidation request, and
the invalidation request is stored in the queue at the same time as transmission of a response to the invalidation command or after the transmission.

10. The memory system according to claim 9, wherein
the data map is used to specify the data to be moved when garbage collection is executed, and
the data map includes flag information which indicates whether the data stored in each physical address corresponding to the flag information is valid or invalid.

11. The memory system according to claim 9,
wherein other commands received from the host after the invalidation command are executed in preference to the invalidation request, and
the controller is configured to retrieve the invalidation request from the queue after the other commands are executed and update the data map based on the invalidation request.

12. The memory system according to claim 11, wherein the address translation table has a hierarchical structure and comprises a plurality of fragment tables corresponding to a plurality of hierarchies.

13. The memory system according to claim 9, wherein the address translation table has a hierarchical structure and comprises a plurality of fragment tables corresponding to a plurality of hierarchies.

14. A memory system that is connectable to a host,
a non-volatile memory; and
a controller configured to be electrically connected to the non-volatile memory to control the non-volatile memory,
wherein the non-volatile memory is configured to store
an address translation table for managing a correspondence between a logical address used by the host to access the memory system and a physical address in which data in the non-volatile memory is written, and
a data map for managing whether the data written in the non-volatile memory is valid or invalid,
in a case where an invalidation command for invalidating the data written in the non-volatile memory is received from the host, the controller is configured to update the address translation table and the data map based on the invalidation command,
a response to the invalidation command is transmitted to the host after the address translation table is updated and before the data map is updated,
the controller is configured to store an invalidation request based on the invalidation command in a queue, retrieve the invalidation request from the queue after the response to the invalidation command is transmitted to the host, and update the data map based on the invalidation request,
the controller is configured to store a plurality of invalidation requests based on a plurality of invalidation commands in a queue, and execute priority control for the invalidation requests, and the controller is configured to preferentially update the data map based on the invalidation request comprising a fragment table whose hierarchy is higher than the hierarchy corresponding to the fragment table in each of the invalidation requests.

15. The memory system according to claim 14, wherein the data map is used to specify the data to be moved when garbage collection is executed, and the data map includes flag information which indicates whether the data stored in each physical address corresponding to the flag information is valid or invalid.

16. The memory system according to claim 14, wherein other commands received from the host after the invalidation command are executed in preference to the invalidation request, and the controller is configured to retrieve the invalidation request from the queue after the other commands are executed and update the data map based on the invalidation request.

17. The memory system according to claim 14, wherein the address translation table has a hierarchical structure and comprises a plurality of fragment tables corresponding to a plurality of hierarchies.

18. The memory system according to claim 17, wherein the address translation table has a hierarchical structure and comprises a plurality of fragment tables corresponding to a plurality of hierarchies.

* * * * *